United States Patent
Parulkar et al.

(10) Patent No.: US 10,986,387 B1
(45) Date of Patent: Apr. 20, 2021

(54) CONTENT MANAGEMENT FOR A DISTRIBUTED CACHE OF A WIRELESS MESH NETWORK

(71) Applicant: Amazon Technologies, Inc., Seattle, WA (US)

(72) Inventors: Ishwardutt Parulkar, San Francisco, CA (US); Kaixiang Hu, Fremont, CA (US); Kiran Kumar Edara, Cupertino, CA (US); Kevin Tseng, Fremont, CA (US); Joshua Aaron Karsh, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 16/143,287

(22) Filed: Sep. 26, 2018

(51) Int. Cl.
| | |
|---|---|
| *H04N 21/25* | (2011.01) |
| *H04N 21/234* | (2011.01) |
| *H04N 21/858* | (2011.01) |

(52) U.S. Cl.
CPC ......... *H04N 21/251* (2013.01); *H04N 21/234* (2013.01); *H04N 21/8586* (2013.01)

(58) Field of Classification Search
CPC . H04N 21/251; H04N 21/8586; H04N 21/234
See application file for complete search history.

(56) References Cited

U.S. PATENT DOCUMENTS

| | | | |
|---|---|---|---|
| 2009/0119455 A1 | 5/2009 | Kisel et al. | |
| 2012/0198075 A1* | 8/2012 | Crowe | H04L 67/2842 709/226 |
| 2013/0246643 A1 | 9/2013 | Luby et al. | |
| 2015/0033272 A1* | 1/2015 | Ganesan | H04N 21/6543 725/100 |
| 2015/0142914 A1* | 5/2015 | Lau | H04B 7/024 709/217 |
| 2018/0167486 A1 | 6/2018 | Pacella et al. | |
| 2018/0241837 A1* | 8/2018 | Yellin | H04L 67/2847 |
| 2019/0089756 A1* | 3/2019 | Wissingh | H04N 21/44209 |

OTHER PUBLICATIONS

Named-data.net, NDN Packet Format Specification 0.3 documentation, Aug. 21, 2018, https://web.archive.org/web/20180821065228/https://named-data.net/doc/NDN-packet-spec/current/name.html (Year: 2018).

* cited by examiner

*Primary Examiner* — Junior O Mendoza
(74) *Attorney, Agent, or Firm* — Lowenstein Sandler LLP

(57) ABSTRACT

Technology for content distribution in wireless mesh network is described. In one embodiment, a cloud computing system includes one or more computing devices running a media provider service and a content management service. The media provider service is configured to select a subset of a plurality of media titles having a highest relative popularity available from one or more media content providers for distribution to one or more mesh nodes in a wireless mesh network. The content management service is configured to retrieve media content files corresponding to the subset of the plurality of media titles, divide each of the media content files into a plurality of smaller segments, send at least a portion of the plurality of smaller segments to the one or more mesh nodes in the wireless mesh network.

18 Claims, 15 Drawing Sheets ed herein.

CONTENT MANAGEMENT FOR A DISTRIBUTED CACHE OF A WIRELESS MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
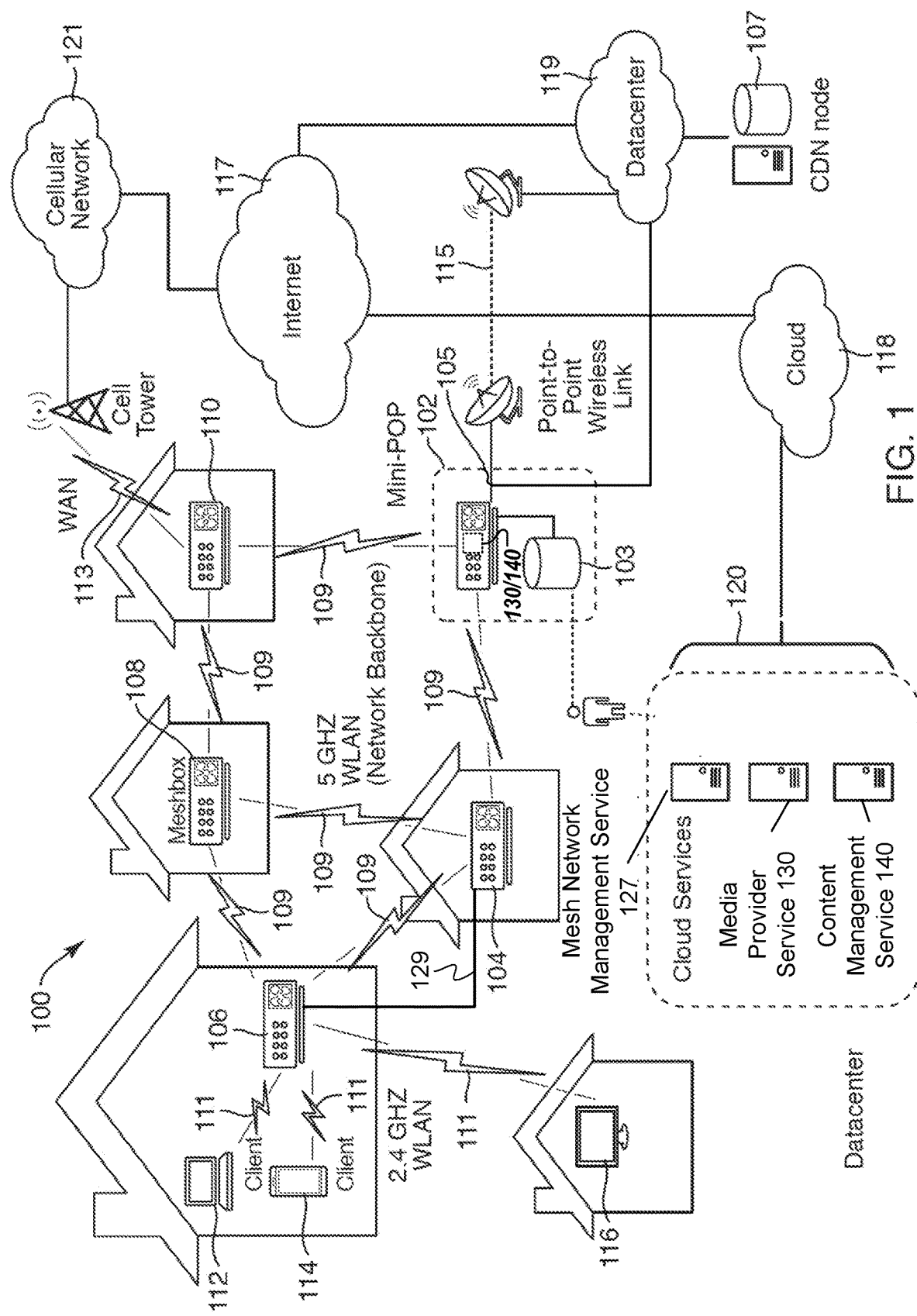
FIG. 1 is a network diagram of network hardware devices organized in a mesh network for content distribution to client devices in an environment of limited connectivity to broadband Internet infrastructure, according to an embodiment.

Technology for content management in a distributed cache of a wireless mesh network is described herein. As part of a goal to provide high quality media content to users that might not have access to broadband services, the content distribution system described herein may be logically divided into two portions. First, a cloud-based media provider service handles media content selection and maps each title to its specific playback resources, such as video, audio, subtitles, manifest file, etc. Second, a cloud-based content management service provides an interface for providers to submit contents into the mesh networks, and then distributes that content to the mesh nodes of the wireless mesh network accordingly. This logical separation allows each service in the content distribution system to have a clearly defined boundary, which provides a number of benefits. By reusing the file-level content management service to push media content, any other services that want to distribute files or other data to end users (e.g., over-the-air (OTA) services) can use the same infrastructure to distribute other files or data to the nodes of the mesh network. In addition, there is an abstraction around the content provider logic that allows the system to support new providers with minimal effort. Furthermore, the system is easily adaptive to new functional requirements such as live-streaming, for example.

In one embodiment, the file level content management service can support one or more of multiple different levels of distribution granularity. At the network level, the same set of contents is distributed to all clusters in the network. At the cluster level, a unique set of contents can be distributed to each separate cluster. At the device level, contents are selected and distributed for each individual device. In one embodiment, the content management service may be configured to implement the cluster level distribution granularity unless configured otherwise. Since each mesh node in the wireless mesh network is designed to support a small number of mesh clients who may request media playback, it may not be efficient to optimize media content at the individual device level. In addition, it may be too limiting to force all clusters to share the same content offering, especially since the various clusters can be deployed in different demographic locations. Also, since the mesh network operates at a cluster level, with underlying mesh technology enabling an Internet Protocol (IP) layer connection between any nodes in the cluster, a single copy of a file can be retrievable by all nodes in the same cluster. As long as there exists a topological path, between any two nodes in a cluster, in the absence of a common IP layer addressing among these nodes, these nodes can still discover contents in the cluster via their logical neighbors (or other nodes they are aware of). Furthermore, the number of mesh nodes participating in a given cluster is well bounded, and the system can scale by deploying more clusters. This allows the system to allocate compute and storage on a per-cluster basis, allowing content services to scale in the same dimension.

In one embodiment, each mesh node in the wireless mesh network includes a content update agent configured to receive a content command from the content management service, which is communicatively coupled to the wireless mesh network. The content command may identify one or more segments of a media content file corresponding to a media title which are to be stored in a distributed caching system of the mesh node. The distributed caching system on the mesh node is coupled to the content update agent and is configured to store the one or more segments of the media content file specified in the content command. In one embodiment, certain segments of the same media file may be distributed across multiple nodes such that the distributed caching system on each node stores at least one media content segment that is not stored on any other mesh node in the wireless mesh network. The mesh node further includes a content server coupled to the distributed caching system which is configured to service requests for playback of media titles from one or more mesh clients communicatively coupled to the mesh node. Additionally, the content server can serve any files that clients might request in addition to media files, such as OTA packages for software update, etc. The content server can retrieve requested segments from the local distributed caching system or can utilize a mesh communication component to communicate directly with other nodes in the wireless mesh network (or indirectly via one or more intermediate nodes) to retrieve segments stored on those other nodes but not on the local node. Additional details of the content distribution system are provided below.

FIG. 1 is a network diagram of network hardware devices 102, 104, 106, 108, and 110, organized in mesh network 100, for content distribution to client consumption devices in an environment of limited connectivity to broadband Internet infrastructure, according to one embodiment. The mesh network 100 includes multiple network hardware devices 102, 104, 106, 108, and 110 that connect together to transfer digital content through the mesh network 100 to be delivered to one or more client consumption devices connected to the mesh network 100. In the depicted embodiment, the mesh network 100 includes a miniature point-of-presence (mini-POP) device 102 (also referred to as a mini-POP device), having a first wired connection to an attached storage device 103 and potentially at least one of a wired connection 105 or point-to-point wireless connection 115 to a content delivery network (CDN) device 107 (server of a CDN or a CDN node) of an Internet Service Provider (ISP), or both. The CDN device 107 may be a POP device, an edge server, a content server device, or another device of the CDN. The mini-POP device 102 may be similar to POP devices of a CDN in operation. However, the mini-POP device 102 is called "miniature" to differentiate it from a POP device of a CDN given the nature of the mini-POP device 102 being a single ingress point to the mesh network 100; whereas, the POP device of a CDN may be one of many in the CDN.

The point-to-point wireless connection 115 may be established over a point-to-point wireless link 115 between the mini-POP device 102 and the CDN device 107. Alternatively, the point-to-point wireless connection 115 may be established over a directional microwave link between the mini-POP device 102 and the CDN device 107. In other embodiments, the mini-POP device 102 is a single ingress node of the mesh network 100 for the content files stored in the mesh network 100. Thus, the mini-POP 102 may be the only node in the mesh network 100 having access to the attached storage and/or a communication channel to retrieve content files stored outside of the mesh network 100. In other embodiments, multiple mini-POP devices may be deployed in the mesh network 100, but the number of mini-POP devices may be much smaller than a total number of network hardware devices in the mesh network 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. All of the network hardware devices of the mesh network 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless connection 115. The point-to-point wireless connection 115 can be considered a broadband connection for the mesh network 100. In some cases, the mini-POP device 102 does not have an Internet connection via the point-to-point wireless connection 115 and the content is stored only in the attached storage device 103 for a self-contained mesh network 100. In such cases, the content in the attached storage can be manually refreshed from time to time.

The mesh network 100 also includes multiple mesh nodes 104, 106, 108, and 110 (also referred to herein as meshbox nodes and network hardware devices). The mesh nodes 104, 106, 108, and 110 may establish multiple P2P wireless connections 109 between mesh nodes 104, 106, 108, and 110 to form a network backbone. It should be noted that only some of the possible P2P wireless connections 109 are shown between the mesh nodes 104, 106, 108, and 110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection 109. In addition, one or more of the mesh nodes 104, 106, 108, and 110 may be connected via a wired communication link. In particular, the first mesh node 104 is coupled to the second mesh node 106 via a wired communication link 129. In embodiments, where mesh network 100 includes both wireless communication links 109 and at least one wired communication link 129, the mesh network 100 may be referred to herein as a "hybrid" mesh network. The mesh nodes 104, 106, 108, and 110 (and the mini-POP device 102) may be MRMC mesh network devices. As described herein, the mesh nodes 104, 106, 108, and 110 do not necessarily have reliable access to the CDN device 107. The mesh nodes 104, 106, 108, and 110 (and the mini-POP device 102) wirelessly communicate with other nodes via the network backbone via a first set of WLAN channels reserved for inter-node communications. The mesh nodes 102, 104, 106, 108, and 110 communicate data with one another via the first set of WLAN channels at a first frequency of approximately 5 GHz (e.g., 5 GHz band of the Wi-Fi® network technologies).

Each of the mesh nodes 104, 106, 108, and 110 (and the mini-POP device 102) also includes multiple node-to-client consumption devices (N2C) wireless connections 111 to wirelessly communicate with one or more client consumption devices via a second set of WLAN channels reserved for serving content files to client consumption devices connected to the mesh network 100. In particular, the second mesh node 106 is wirelessly coupled to a first client consumption device 112 via a first N2C wireless connection 111, a second client consumption device 114 via a second N2C wireless connection 111, and a third client consumption device 116 via a third N2C wireless connection 111. Client consumption devices can include TVs, mobile phones, streaming media players, PCs, Tablets, game consoles, and the like. The second node 106 wirelessly communicates with the client consumption devices via the second set of WLAN channels at a second frequency of approximately 2.4 GHz (e.g., 2.4 GHz band of the Wi-Fi® network technologies).

One or more of the mesh nodes 104, 106, 108, and 110 (and the mini-POP device 102) also includes a cellular connection 113 to wirelessly communicate control data between the respective node and a cloud device 118 hosting a mesh network control service 125 described below. The cellular connection 113 may be a low bandwidth, high availability connection to the Internet 117 provided by a cellular network 121. The cellular connection 113 may have a lower bandwidth than the point-to-point wireless connection 115. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The cloud device 118 may be one of a collection of devices organized as a cloud computing system that that hosts one or more services 120. Although cellular connection 113 may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the mesh network 100 remotely. Also, the cellular connection 113 may aid in the debugging and optimization of the mesh network 100. In other embodiments, other low bandwidth services may also be offered through this link (e.g. email, shopping on Amazon.com, or the like). As a result of cellular connection 113, or other external connection (e.g., Ethernet, Fiber, etc.), mesh node 110 and mini-POP device 102 can be considered gateway computing devices and/or root nodes. Other mesh nodes 104, 106, and 108 can communicate with the root nodes to access network resources external to the mesh network 100, such as CDN device 107, Internet 117, cloud device 118, datacenter 119, cellular network 121, or other external resources.

The services 120 may include a mesh network management service (or system) 127, a media provider service 130, and a content management service 140. The services 120 may also include cloud services to control setup of and manage the mesh nodes, as well as other cloud services. In one embodiment, media provider service 130 and content management service 140 are subcomponents of the larger mesh network management service 127 which provides other functionality in addition. The mesh network management service 127 can be one or more cloud services. These cloud services can include a metric collector service, a health and status service, a link selection service, a channel selection service, a content request aggregation service, or the like. There may be APIs for each of these services.

In one embodiment, the services 120 provide high quality video-on-demand (VOD) over a wireless mesh of devices installed on customer premises. On top of the devices and the mesh, is the content management system, which integrates the content provider backend, caching, handling of files, distribution and serving of content to clients. The content management system architecture is segmented into multiple layers including media provider service 130 which is a unified content curation service with content provider specific adapters for catalog and metric ingestion, content management service 140 which provides file level distribution and tracking management, device applications on the mesh nodes that serve contents to end user as well as perform local content addition/removal as instructed by the management layer, and device side caching that is tied to the underlying mesh stack where the content is placed in storage on a mesh node, and which can also be fetched from other devices (e.g. using 802.11s).

Since each mesh node has very limited storage, the amount of media content that can be stored on each node is also limited. Each video title may have a large number of different associated asset files. For example, each video title may have multiple, independent files for streaming protocols (DASH, HLS, Smooth Streaming, etc.), resolutions (720p, 1080p, etc.), encoding algorithms (H.264, H.265, AV1, etc.), bit-rates (2 Mbps, 3 Mbps, etc.), audio formats, dubbing languages and sub-titles in various languages. The association, organization and delivery of these files can be managed using a manifest file. For example, the DASH manifest file, called the Media Presentation Description, is an XML file that identifies the various content components and the location of all alternative streams. This enables the DASH player to identify and start playback of the initial segments, switch between representations as necessary to adapt to changing CPU and buffer status, and change adaptation sets to respond to user input, like enabling/disabling subtitles or changing languages. To make efficient use of the limited, expensive storage on the mesh nodes, content management service 140 can filter the manifest down to a small related subset of formats and operations to be used by the mesh nodes. By filtering or thinning manifest files, that the goal of dealing with the minimum number of formats and operations required to serve customers in an edge cache is achieved. Another advantage of thinning the manifest files is to indirectly control the bitrate selection available to clients, thereby indirectly controlling or limiting how client side logic can perform resource selection processes.

In addition, some of the primary challenges of moving content within the wireless mesh network are the very large video files, and the link bandwidth in the mesh network being constrained and also changing dynamically because of change in radio frequency characteristics, environment conditions and traffic. In one embodiment, the various content handling actions, such as transfer of content when updating, when distributing it across nodes, when staging before deployment, as well as when delivering it to client, is done at a finer granularity than a large file corresponding to a 2-hour long movie, for example. In one embodiment, content management service 140 may segment the files into smaller chunks (size being based on specific criteria), manage these chunks and move them across the mesh network, assembling them at appropriate points in the mesh network to service client requests and deliver as a contiguous video stream. Content management service 140 hides the segmentation from end applications running on each node and provides APIs that operate on the original file and allow read operations to be performed with byte-offset ranges. Content management service 140 can track a file segment by using the file's content reference (e.g., origin URL) with a corresponding byte-offset range for the segment. It passes these details to a node which fetches a corresponding portion of the original file, giving the desired file segmentation effect. Checksum/hash values of each segment are also pre-computed and sent to the devices to assist in file integrity verification and look-up operations.

In a cluster where the mini-POP device 102 stores a subset of the total content provider catalog, that subset can be cached across the set of nodes which form the wireless mesh network. Each node has significantly less storage than the mini-POP device can the collection of nodes can be looked as a distributed edge cache. The method for spreading the content across this distributed cache of D-nodes is driven by the goals of making most popular content available as close to the users as possible in the mesh to conserve mesh bandwidth, reducing the time to first frame for users requesting content present in the distributed cache, and reducing cache miss delay for content not present in the distributed cache. In one embodiment, content management service 140 may implement a caching scheme where the top few video titles are fully cached in every node, the first segment of all titles available in the distributed cache is cached in every node, the first segment of all titles in the content provider catalog is cached in every node (regardless of whether the full title is in the distributed cache or not), and/or a hash function is used to map content segments to the nodes. Each one of these schemes may be applied statically, irrespective of requests from the users, and may be periodically refreshed as the available content changes.

Content management service 140 may implement caching algorithms that determine which content file (or a segment of a content file) corresponding to a title in the catalog is mapped to which mesh node. Content management service 140 may place the content in the specified node according to the map over the wireless network. Also when a user requests certain content, the mechanism determines which node the content is available in and then finds a path through the wireless network deliver the content to the requesting user. The mechanism uses a hierarchical file naming convention, IP/MAC addresses of the mesh nodes, the caching map, the network topology and/or a network layer routing/switching protocol. The caching map is pushed to each of the nodes, which broadcast a request for all the content segments that need to be present in the node over the wireless network. When a receiving node matches, it uses the IP address of the requestor and passes it to the network layer to route the content delivery. When a user requests, the user request is similarly broadcast to find the content in the network.

In one embodiment, before deployment of mesh nodes on customer premises, the devices can be populated with content. If devices were deployed without any content in them, then all the initial requests for content will be "cache misses," which would require them to be fetched over the backhaul from the content provider's content delivery network (CDN). This would lead to a very poor customer experience, including situations where content might not be available at all. The pre-staging techniques described herein account for filling content in a manner such that it will be consistent when the mesh is formed, parallelization, so that it is done in a timely manner, without slowing down the deployment line, and the addition/deletion of a node from the mesh because of failures or a device replacement at the time of deployment.

In one embodiment, media provider service 130 and content management service 140 can be deployed in a centralized configuration, such as part of mesh network management service 127 or one of other services 120. Alternatively, in another embodiment, media provider service 130 and/or content management service 140 can run directly on mini-POP device 102 in mesh network 100. Additional details regarding the operations of media provider service 130 and content management service 140 are provided below with respect to FIGS. 3-7.

Although only four mesh nodes 104, 106, 108, and 110 are illustrated in FIG. 1, the mesh network 100 can use many mesh nodes, wirelessly connected together in a mesh network, to move content through the mesh network 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running client software (i.e., a media client). In one embodiment, the client software may be an application or other program designed to enable access to the CDN catalog and provide for playback video titles or other media items selected therefrom, in response to a request from a user. The 2.4 GHz WLAN channels are reserved for serving client consumption devices. The 2.4 GHz band may be chosen for serving media clients because there is a wider device adoption and support for this band. Additionally, the bandwidth requirements for serving client consumption devices will be lower than that of the network backbone. The number of media clients that each Meshbox node can support depends on a number of factors including memory, bandwidth requirements of the media client, incoming bandwidth that the Meshbox node can support, and the like. For example, the Meshbox nodes provide coverage to users who subscribe to the content delivery service and consume that service through the client consumption devices (e.g., a mobile phone, a set top box, a tablet, or the like). It should be noted that there is a 1-to-many relationship between Meshbox nodes and households (not just between nodes and media clients). This means the service can be provided without necessarily requiring a user to have a Meshbox node located in their house, as illustrated in FIG. 1. As illustrated, the second mesh node 106 services two client consumption devices 112, 114 located in a first house, as well as a third client consumption device 116 (e.g., a TV client) located in a second house. The Meshbox nodes can be located in various structures, and there can be multiple Meshbox nodes in a single structure.

The mesh network 100 may be used to address two main challenges: moving high bandwidth content to users and storing that content in the limited available storage of the mesh network itself. The first challenge may be addressed in hardware through the radio links between mesh nodes and the radio links between mesh nodes and client consumption devices, and in software by the routing protocols used to decide where to push traffic and link and channel management used to configure the mesh network 100. The second challenge may be addressed by borrowing from the existing content distribution strategy employed by the content delivery services using caches of content close to the user. The architecture to support content caching is known as a CDN. An example CDN implementation is the AWS CloudFront service. The AWS CloudFront service may include several point-of-presence (POP) racks that are co-located in datacenters that see a lot of user traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the mesh network 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 may not have a wired or wireless network connection to the next level of cache (i.e., in CDN node 107). In another embodiment, the mini-POP device 102 may have a network connection (e.g., via the Internet) to the next level of cache, but this connection may not be a high-speed backhaul such as that used in a traditional data center. The following describes two different solutions for providing access to the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss. It should be noted that the mini-POP has a network connection that need not be an Internet connection to handle cache misses. These requests are forwarded to the CDNs. Alternatively, some mini-POP devices may not have network connections and do not handle cache misses as described herein.

The mesh network 100 may be considered a multi-radio multi-channel (MRMC) mesh network. MRMC mesh networks are an evolution of traditional single radio mesh networks and a leading contender for combatting the radio resource contention that has plagued single radio mesh networks and prevents them from scaling to any significant size. The mesh network 100 has multiple devices, each with multi-radio multi-channel (MRMC) radios. The multiple radios for P2P connections of the mesh network devices allow the mesh network 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The mesh network 100 can provide adequate bandwidth, especially node-to-node bandwidth. For video, content delivery services recommend a minimum of 900 Kbps for standard definition content and 3.5 Mbps for high definition content. It should be noted that the minimum requirement for 720 HD is 1.9 Mbps and a maximum is 3.5 Mbps. For some services to provide HD content, the 3.5 Mbps can be considered the minimum requirement. The mesh network 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the mesh network 100 can be self-contained as described herein. The mesh network 100 may be self-contained in the sense that content resides in, travels through, and is consumed by nodes in the mesh network without requiring the content to be fetched outside of the mesh network 100. In other embodiments, the mesh network 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the mesh network 100 via the point-to-point wireless connection 115 or the HITL process at the mini-POP device 102. Availability and impact on cost in terms of storage may be relevant factors in determining which content is to be injected into the mesh network 100 and which content is to remain in the mesh network 100. A challenge for traditional mesh network architectures is that this content is high bandwidth (in the case of video) and so the gateway nodes (e.g., mesh node 110 and mini-POP device 102) that connect the mesh to the larger Internet 117 must be also be high bandwidth. However, taking a closer look at the use case reveals that this content, although high bandwidth, does not need to be low latency. The embodiments of the mesh network 100 described herein can provide distribution of content that is high bandwidth, but in a manner that does not need low latency. Thus, popular content can reside closer to the client consumption devices of the mesh network 100 and reduce the latency normally associated with retrieving that content from the CDN.

In some embodiments, prior to consumption by a node having a media client itself or being wirelessly connected to a media client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the mesh network 100. The mesh network 100 can provide some fault tolerance so that a single mesh node becoming unavailable for failure or reboot has minimal impact on availability of content to other users. This means that a single mesh node is not the sole provider of a piece of content. The mesh network 100 can use reliability and availability mechanisms and techniques to determine where and how to store content in the mesh network 100.

The mesh network 100 can be deployed in an unpredictable environment. Radio conditions may not be constant and sudden losses of power may occur. The mesh network 100 is designed to be robust to temporary failures of individual nodes. The mesh network 100 can be designed to identify those failures and adapt to these failures once identified.

Additionally, the mesh network 100 can include mechanisms to provide secure storage of the content that resides within the mesh network 100 and prevent unauthorized access to that content.

The cloud services 120 of the mesh network 100 can include mechanisms to deal with mesh nodes that become unavailable, adding, removing, or modifying existing mesh nodes in the mesh network 100. The cloud services 120 may also include mechanisms for remote health and management. For example, there may be a remote health interface, a management interface, or both to access the mesh nodes for this purpose. The cloud services 120 can also include mechanisms for securing the mesh network 100 and the content that resides in the mesh network 100. For example, the cloud services 120 can control device access, DRM, and node authentication.

Figure 2:
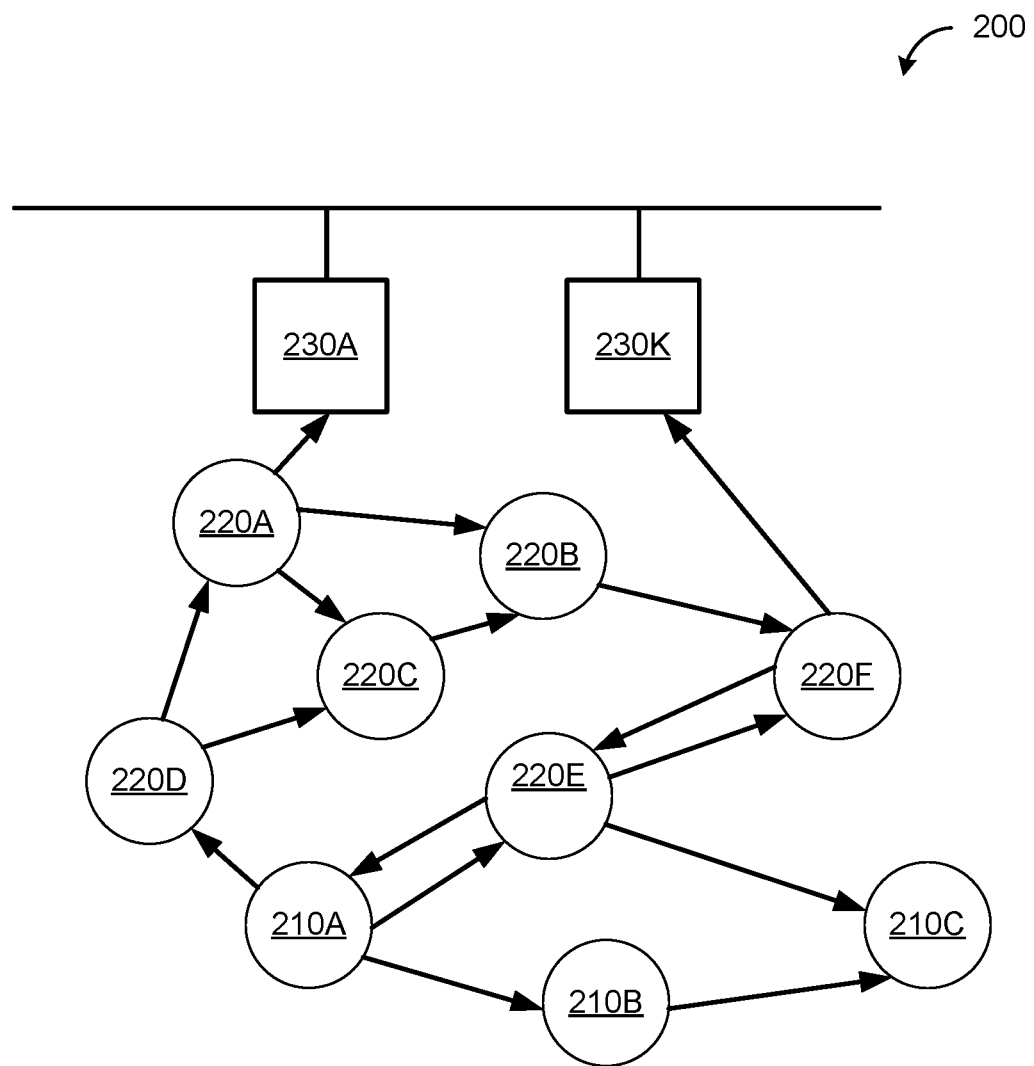
FIG. 2 is a functional network diagram of an illustrative example of a mesh network operating in accordance with embodiments of the present disclosure.

FIG. 2 is a functional network diagram of an illustrative example of a mesh network operating in accordance with embodiments of the present disclosure. In one embodiment, each of the network devices of mesh network 100 of FIG. 1 may implement functions of one or more functional components of FIG. 2. In other embodiments, various other mesh networks may include hardware and/or software components which may implement functions of one or more functional components of FIG. 2.

As schematically illustrated by FIG. 2, an example mesh network 200 may include a plurality of mesh network nodes including communication devices that implement the functions of wireless mesh point stations (MP STA) 210A-210C, mesh access points (MAP) 220A-220F, and mesh portals (MPP) 230A-230K. In one embodiment, the wireless mesh network 200 may be compliant with IEEE802.11s protocol, which supports broadcast/multicast and unicast delivery using radio-aware path selection metrics over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a mesh network operating in accordance the embodiments of the present disclosure (e.g., mesh network 100 of FIG. 1). Discovering available mesh networks may be performed by passive or active scanning. In the passive scanning mode, the network device records the information from any beacon frames that have been received on one or more radio channels. Beacon frames are periodically transmitted by wireless access points in order to allow network devices to detect and identify the mesh network, as well as match communication parameters for determining whether to join the mesh network. In the active scanning mode, the network device may transmit, on each of one or more radio channels supported by the network device, probe request frames in order to solicit responses from available networks. An access point receiving a probe request may generate a probe response advertising the network parameters.

Figure 3:
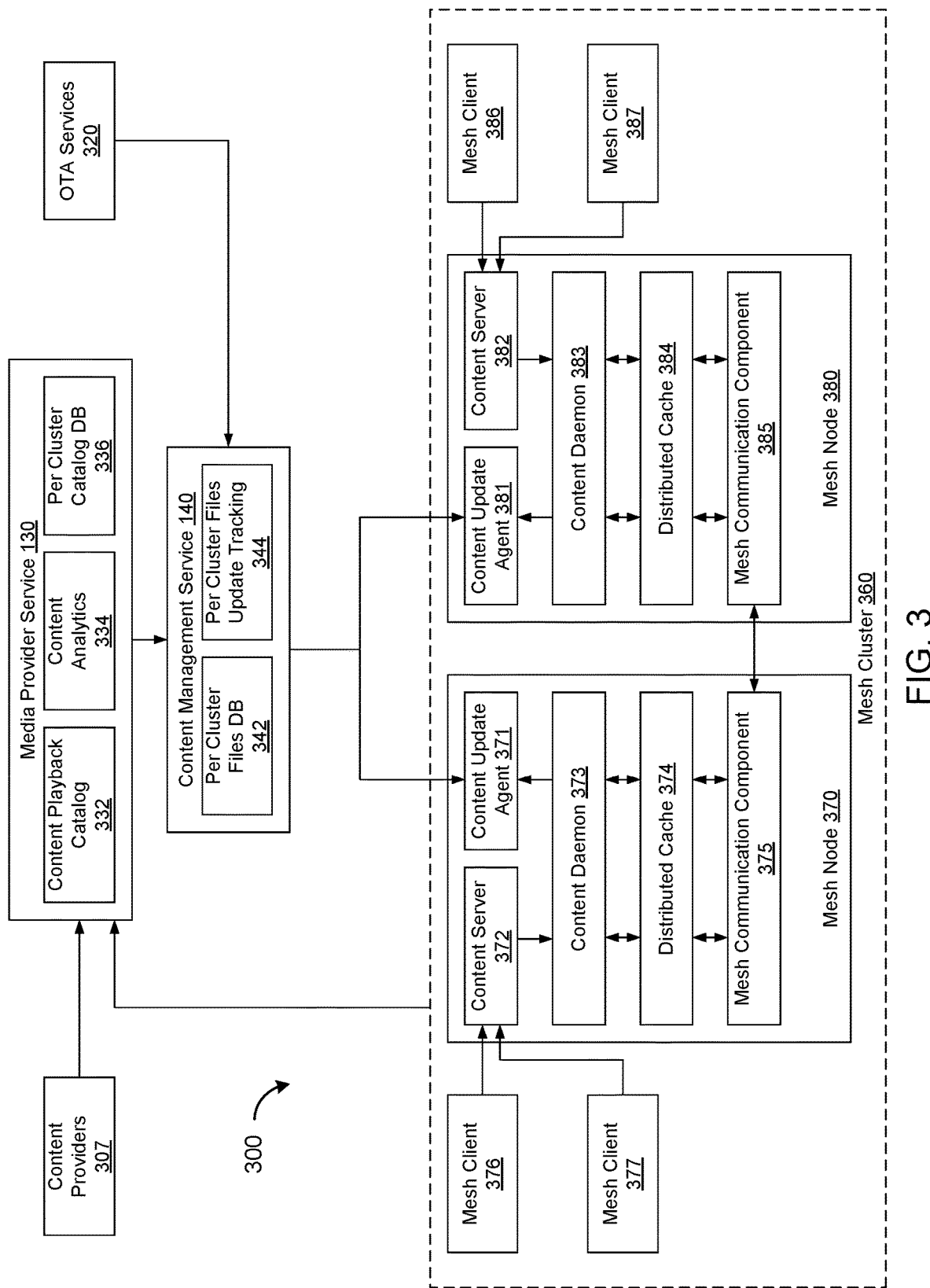
FIG. 3 is a block diagram illustrating a content distribution system, according to an embodiment.

FIG. 3 is a block diagram illustrating a content distribution system 300, according to an embodiment. In one embodiment, the content distribution system 300 is segmented into multiple layers in order to implement the above referenced design decisions. In one embodiment, media provider service 130 is a unified content curation service with content provider specific adapters for catalog and metric ingestion, and content management service 140 is a file level distribution and tracking management service. In addition, system 300 includes device applications, such as content update agents 371 and 381 (also referred to herein as "content agents" or simply "agents") on the mesh nodes 370 and 380, themselves, that serve contents to end user as well as perform local content addition/removal as instructed by content management service 140, and device side caching layers, such as distributed caches 374 and 384 and mesh communication components 375 and 385, that are tied to the underlying mesh stack where a device can fetch contents from other devices using wireless communication protocols (e.g., 802.11s). In other embodiments, mesh communication components 375 and 385 may communicate with one another using wired channels, such as coaxial cable, Ethernet, etc.

As the content distribution system 300 spans different service layers and device applications, it calls for a consistent way of organizing, identifying, and naming media content. From a content provider's point of view, a typical video/audio asset may be identified by one or more identifiers that uniquely map assets to a particular distribution, its encoding technology, specific bitrates, etc. For non-video content, however, such as software update packages, they may be identified by the targeted device, software type and version. A natural way to provide a common naming system might be grouping content by its providers, and then applying provider specific identification and organization schemes. Additionally, whenever possible, a structured hierarchy of names may be used, instead of generating a unique number sequence. In one embodiment, the content distribution system 300 embraces an information/content centric naming convention (e.g., Named Domain Networking (NDN)) to name and identify content among all service and device layers. A sample NDN style uniform resource identifier (URI) is of the following format: mesh:/company/service/996264ca-ac85-4c8b-a20a-e4111948633a/dash/video/7/data.

In one embodiment, content distribution system 300 breaks large files into smaller segments, typically in the range of 2-15 megabytes (MB) each. These segments can be stored as individual files on mesh nodes 370 and 380. File segmentation sizes can also be non-uniform, and the first segment of any file can to be much smaller than other segments of the same file. For example, a MP4 file of 50 MB can be broken down into segments of 5 MB, 15 MB, 15 MB, and 15 MB. In one embodiment, this file segmentation is hidden from applications running on each mesh node 370 and 380. In one embodiment, there are application programming interfaces (APIs) that operate on the original file and allow read operations to be performed on the segments with byte-offset ranges. Another characteristic of file segmentation is that each cluster, such as mesh cluster 360 including mesh nodes 370 and 380, can choose to use a common file segmentation policy, or can operate on a per individual file basis. In one embodiment, the cloud side services such as media provider service 130 and content management service 140, do not perform physical segmentations, nor do they store segmented files on the cloud side. Content management service 140 tracks a file segment using the file's origin uniform resource locator (URL) with a corresponding byte-offset range. Content management service 140 can pass a URL+Offset tuple to one of mesh nodes 370 or 380, which can perform a hypertext transfer protocol (HTTP) GET operation to fetch the portion of the original file, giving the desired file segmentation effect.

In one embodiment, media provider service 130 manages media content from content providers 307 for a given mesh cluster 360. Media provider service 130 may include a number of adapter specific modules that each fetch content playback catalog data 332 and content analytics (e.g., metric) data 334 from content providers 307, and a unified curation module that uses policies and metrics to select suitable content from content providers for the mesh cluster 360, which is maintained in a per cluster catalog database 336. On a periodic basis, media provider service 130 may fetch, process, correlate, and store video session/title level metrics for deriving a title popularity ranking. In one embodiment, the title popularity ranking is reflective of the titles that best anticipate user requests, or in other words, the titles that provide the best cache-hit ratio. Popularity ranking is merely one of the techniques that can be used to achieve this goal of improving the cache-hit ratio at a reasonable cost. These metrics can come from either a content provider's user playback metric report, which may be aggregated, for example, at a city or regional level, or from cluster specific servicing metrics. In one embodiment, media provider service 130 may further track the content provider's catalog and assets, as well as its ability to convert a given title to a list of associated assets such as audio/video/manifest or subtitle files. In addition, on a per cluster basis, media provider service 130 may select and track most the relevant video titles for the users of mesh cluster 360, convert the desired title list to a set of assets using its catalog information 332 and submit it to content management service 140.

With respect to the metrics, media provider service 130 queries mesh cluster 360 to get file level serving metrics on a per-cluster basis, and correlates those to title level popularity metrics belonging to a particular one of content providers 307. In one embodiment, media provider service 130 queries user playback session metrics on an incremental basis and stores query results in an online transaction processing (OLTP) friendly database engine as part of content analytics 334.

With respect to catalog management, media provider service 130 listens for catalog update information provided by content providers 307. This may include a per title notification sent when assets of content providers 307 are added, deleted, or updated, with the title being identified by a unique identifier. Media provider service 130 can process these notifications and then use the associated unique identifier to look up associated playback resources via an API provided by content providers 307. Title specific resource data can then be stored in content playback catalog 332, with an indication of the content provider and region used as a hashing key, and unique identifier used as a sorting key.

With respect to content selection, media provider service 130 may schedule a content curation job for every cluster it manages. When this job runs, it loads cluster specific content serving metrics and uses these as a basis to compute title popularity across all providers. Media provider service 130 can select some number of the most popular titles that add up to a pre-configured storage size, translate this list of titles into a list of playback assets using catalog database 336 and submits this file list to content management service 140 for distribution. Media provider service 130 selects titles that will best anticipate user requests, thereby reducing cache-misses (i.e., users requesting content that is not currently cached). Selecting the most popular titles is merely one way of achieving this goal. In other embodiments, other metrics may be used to predict user requests.

Content management service 140 presents a common restful interface for any service to add or remove files from a given cluster. These files can include media content items selected by media provider service 130, or any other file provided by any other service such as one of over-the-air (OTA) services 320. Content management service 140 is responsible for breaking large input files into smaller segments, deciding how file segments are replicated across mesh nodes 370 and 380 within mesh cluster 360, and coordinating with device side content daemons 373 and 383 to achieve desired file segment operations, while still monitoring its progress.

Content management service 140 facilitates file segmentation in at least two ways. First, it maintains a per cluster configuration 342 of file segmentation strategy, which ensures all files submitted to a given cluster will be stored on devices using the pre-configured segmentation policy. Second, content management service 140 also pre-computes checksum or hash values of each segment and sends this checksum to devices to assist in file integrity verification and look up operations. Content management service 140 also adopts an NDN style content addressing scheme at its input and ensures that this scheme gets propagated across all downstream components. When a new file is added to content management service 140, a NDN style URI is given to the file along with its content origin URL. The same NDN URI is then used to perform file deletion operations later on.

In addition, content management service 140 also takes on the challenge of distributing file segments for a given cluster. It performs optimizations such as replicating initial file segments of video assets to most mesh nodes in the cluster to speed up initial time to first frame. Content management service 140 also attempts to reduce file retrieval latency while distributing mesh traffic uniformly by replicating file segments accordingly.

Furthermore, content management service 140 is also responsible for coordinating with content update agents 371 and 381 that run on each of mesh nodes 370 and 380, respectively to add or remove file segments. Content management service 140 attempts to reduce external bandwidth usage by ensuring a given cluster will only download a fresh content once from its origin. To materialize that, content management service 140 tracks and decides, for a given file segment, which mesh node will first download the segment from an external source. When such file segment is replicated on multiple mesh nodes, content management service 140 can track the ordering on how replication is propagated using per cluster files update tracking data 344. The ability to track how a given file segment is added or removed from a mesh node, enables content management service 140 to have an overall view of all the contents in a given cluster, and more precisely, what file segments reside on which mesh node.

Content agent 371 and 381 is a small daemon that runs on each mesh node in the background. It listens to content management service 140 for commands to add or remove file segments to or from the mesh node 370 or 380 on which it runs. These commands or requests may be encoded using protocol buffers, in one embodiment. For add operations, content agent 371 or 381 receives an instruction to download file segments from a specified source and stores them locally into the distributed cache 374 or 384 via content daemon 373 or 383. The download source can resolve to another mesh node within the same mesh cluster 360 or to an external endpoint such as a content delivery network (CDN). For delete operations, content agent 371 or 381 removes the desired file segment, which can be addressed using the hierarchical URI, from the local content layer.

Content daemons 373 and 383 run on each mesh of nodes 370 and 380, respectively, and manage all local content layer interactions. In one embodiment, content daemons 373 and 383 expose a set of remote procedure call interfaces for other daemons to retrieve or delete contents. For example, content agents 371 and 381 and content servers 372 and 382 are two content related applications that are built on top of content daemons 373 and 383, respectively. As described above, content management service 140 can break a large file into smaller file segments. At the same time, content daemons 373 and 383 present a unified read/write access to their clients (e.g., mesh clients 376, 377, 386, 387) at an overall file level. This implies that, when a client wants to read arbitrary byte offset using the file level URI, content daemons 373 or 383 can identify the file segment to which the supplied byte-range corresponds, and then fetch the corresponding file segment or segments accordingly so that it can return the desired data back to the requesting client.

More generally speaking, since the mesh/caching layer in each mesh node 370 and 380 uses checksums to uniquely identify a file segment, this checksum can be known before hand for use in moving the corresponding file segment in a cluster. To enable every mesh node to look up all file segments available in mesh cluster 360, each content daemon 373 and 383 maintains a database that tracks file segments and their corresponding checksums for this exact purpose. In one embodiment, each mesh node 370 and 380 is initially preloaded with a content daemon database that contains checksums for all file segments available in mesh cluster 360. There may also be content for which the checksum is not known beforehand, such as live-streaming data, or files not currently stored in the cache. In these scenarios, as long as there is a way to name and locate the desired resource, content daemon 373 and 383 can use that name as a key to perform a look up. On a periodic basis (e.g., hourly, daily, weekly), content management service 140 may push new file segments to individual mesh nodes in the mesh cluster 360. When these new file segments are download by content agent 371 or 381, content daemon 373 or 383 records the checksums for these new segments into its database. This implies that the content daemon 373 or 383 of every mesh node 370 or 380 will have its database that slowly diverges from other nodes, as those other nodes may end up receiving different file segments. When a file segment is requested by a mesh client that is not found in the local 374 or 384, the content daemon 373 or 383 can issue a request for the segment to other nodes in the mesh network via mesh communication component 375 or 385. In this manner the segment can be retrieved directly from the other mesh node without having to utilize the limited bandwidth network backhaul to cloud services 130 and 140.

Such content database inconsistency can result in certain mesh nodes being unable to lookup or fetch certain file segments, as these segments might have been added later on to other nodes directly. To address such an issue, when content daemon 373 or 383 receives a request for a piece of content for which it does not have a corresponding checksum (i.e., a cache-miss), it will query an upstream HTTP endpoint to resolve such cache miss scenario. If the requested content is available from another node in the mesh cluster 360, the upstream endpoint will return back all checksums associated with the requested content so that the content daemon 373 or 383 can use them to perform lookup/fetch operations accordingly. If the requested content is truly missing from the mesh cluster 360, the upstream endpoint will then return a set of URLs to content daemon 373 or 383, which will pass them back to clients 376, 377, 386 or 387. Depending on the embodiment, the upstream HTTP endpoint can be another mesh node, a mini-POP device, or content management service 140, as they all implement the same lookup interface.

Each mesh node 370 and 380 further includes a content server 372 and 382. Content servers 372 and 382 are web servers that serve HTTP GET traffic. Their main usage is to serve video and image related content requests from mesh clients 376, 377, 386, and 387. Content servers 372 and 382 can be viewed as reverse proxies that will fetch desired content on behalf of their clients. For example, the content servers 372 and 382 may receive a request from one of mesh clients 376, 377, 386, or 387 for a particular media content title and can query an interface for the underlying content daemon 373 or 383 running on the same mesh node 370 or 380.

Together, content management service 140 and the content daemons 373 and 383 form the foundation layer for content distribution system 300. One design goal is to keep this layer as generic as possible and be free of any business/application level logic. For this reason, on the cloud side, any title level selection or popularity correlation logic relating to a content provider may be located in a content provider adaptation layer that sits on top of content management service 140. On the device side, the content server 372 or 382 is where the content specific logic may be placed.

Content servers 372 and 382 may further implement manifest hashing logic and respect network limits on bitrates selection. They may query the underlying content daemon 373 or 383 to see if a requested title is available in the mesh cluster 360 in a high-definition (HD) format, for example. If not, content server 372 or 382 will then serve a standard-definition (SD) manifest and stream the SD video/audio files back to the clients 376, 377, 386, or 387.

To enable caching of streamed media content, for example, or resolving potential database inconsistency in the content daemon, each content server 372 or 382 may also provide a restful interface for the underlying content daemon 373 or 383. This allows content daemon 373 or 383 to exchange information with another content daemon running on a different mesh node from the same cluster. Additionally, content server 372 or 382 and content management service 140 both implement the same set of APIs for querying and resolving content lookups. This enables multiple possibilities with hierarchical look up and caching strategy.

Figure 4:
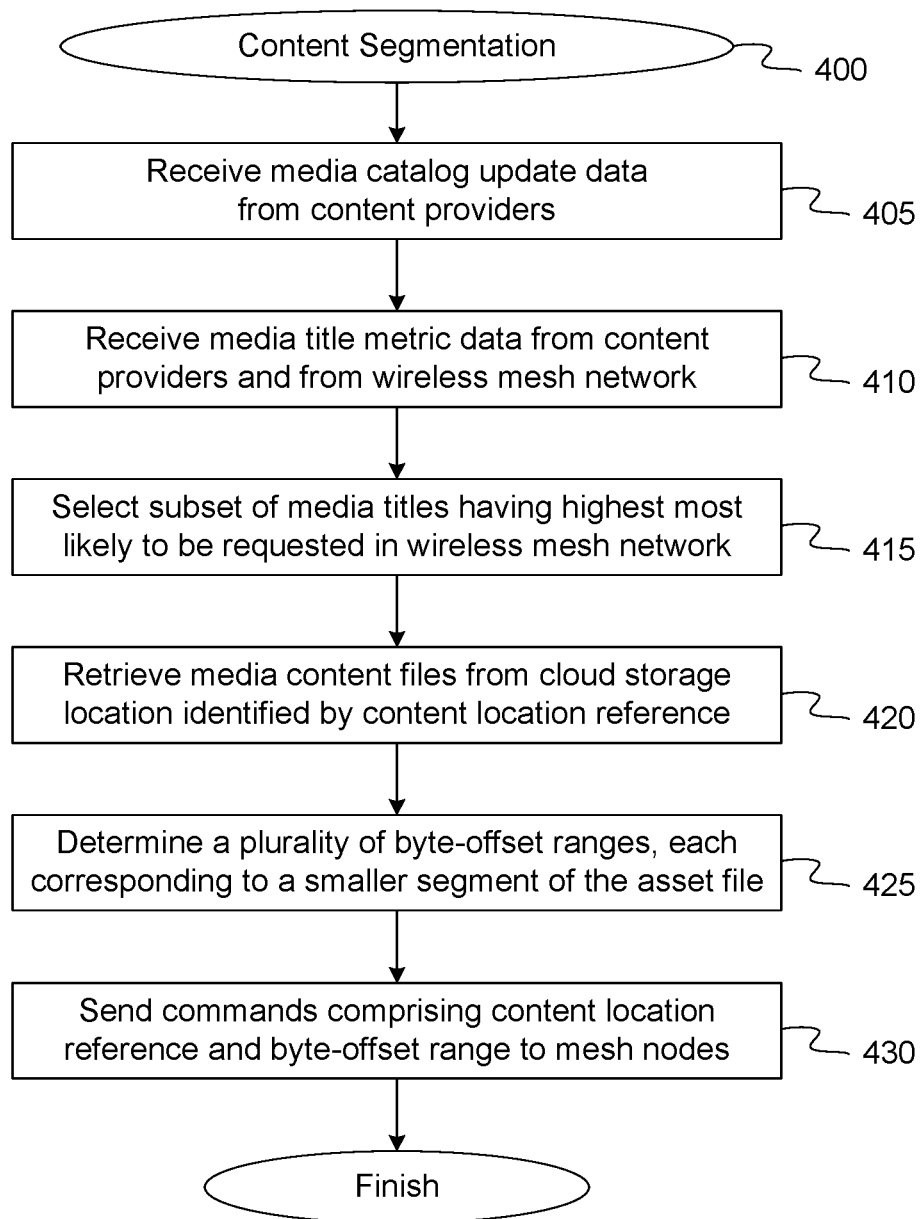
FIG. 4 is a flow diagram illustrating a method of content segmentation and distribution in a wireless mesh network, according to an embodiment.

FIG. 4 is a flow diagram illustrating a method of content segmentation and distribution in a wireless mesh network, according to an embodiment. The method 400 may be performed by processing logic that comprises hardware (e.g., circuitry, dedicated logic, programmable logic, microcode, etc.), software, firmware, or a combination thereof. In one embodiment, method 400 may be performed by media provider service 130 and content management service 140, as shown in FIGS. 1 and 3.

Referring to FIG. 4, at block 405, method 400 receives media catalog update data from the one or more media content providers 307. In one embodiment, media provider service 130, receives the media catalog update data comprising an indication of the plurality of media titles available from the one or more media content providers 307. The media titles may include, for example, video titles, audio titles, images, multimedia titles or other types of media content. In one embodiment, the media catalog update data is received in response to a change in the media catalog of media content providers 307, such as an addition of a new title or the removal of an old title. In another embodiment, the media catalog update data is received periodically without respect to a change in the media catalog. In other embodiments, the media catalog update data is received in response to the occurrence of certain events. An event may include, for example, an actor's birthday, a re-release of an older title, the anniversary of some famous occasion on which a media title is based, etc.

At block 410, method 400 receives media title metric data from the one or more media content providers 307 and from the one or more mesh nodes 370, 380 in the wireless mesh network 360. In one embodiment, media provider service 130 receives the media title metric data which includes an indication of a relative popularity of each of the plurality of media titles. The media title metric data from the content providers 307 may include an indication of a global popularity (e.g., measured in terms of total views) of certain media titles across all users, including those outside of wireless mesh network 360. The media title metric data from the mesh nodes 370 and 380 may include an indication of local popularity (e.g., also measured in terms of views) among the specific users of wireless mesh network 360.

At block 415, method 400 selects a subset of a plurality of media titles available from the one or more media content providers 307 having a highest relative popularity for distribution to the one or more mesh nodes 370, 380 in the wireless mesh network 360. In one embodiment, media provider service 130 considers both the global popularity and the local popularity of media titles to determine which media titles have the highest relative popularity. For example, media provider service 130 may add the total number of views together or combine them to form a weighted average. In another embodiment, media provider service 130 may use the media title metric data to make a prediction of which media titles are most likely to be requested by users of the wireless mesh network 360 based on past viewing history, user demographics and preferences, popularity, etc.

At block 420, method 400 retrieves media content files corresponding to the subset of the plurality of media titles from a cloud storage location identified by a content location reference (e.g., an origin uniform resource locator (URL)) associated with the media content file. In one embodiment, content management service 140 retrieves the selected media content files from the cloud storage location (e.g., CDN node 107, as shown in FIG. 1). In one embodiment, content management service 140 does not actually retrieve a physical copy of the media content files, but rather adds an indication of said media content files to per cluster files database 342. The indication of the media content files may include a named data networking (NDN) style uniform resource indicator (URI), for example.

At block 425, method 400 divides each of the media content files into a plurality of smaller segments. In one embodiment, content management service 140, determines a plurality of bye offset ranges for the media content file, wherein each byte offset range corresponds to one of the plurality of smaller segments of the media content file. For example, the smaller segments may be in the range of 2-15 megabytes (MB) each and a corresponding byte offset range may define a start and an end of one of the smaller segments. In one embodiment, the byte offset range defines a starting location of the segment based on how many bytes from the beginning of the media content file the starting location is, as well as a length of the segment (i.e., a number of bytes or MB that the segment comprises). For example, in one embodiment, the byte offset range may be expressed as a pair of values having a format of (starting location, length). Thus, if the byte offset range were expressed as (100, 15), this byte offset range may define a segment of the media content file that starts at around 100 MB from the beginning of the media content file and has a length of 15 MB (i.e., the segment ends at around 115 MB from the beginning of the media content file. In another embodiment, the byte offset range defines both the starting location and the ending location of the segment based on how many bytes each of the starting location and the ending location of the segment is from the beginning of the media content file. For example, in one embodiment, the byte offset range may be expressed as a pair of values having a format of (starting location, ending location). Thus, if the byte offset range were expressed as (150, 165), this byte offset range may define a segment of the media content file that starts at around 150 MB from the beginning of the media content file and ends at around 165 MB from the beginning of the media content file (i.e., the segment has a length of 15 MB). In addition, the sizes of each segment defined by a corresponding byte offset range can be non-uniform, such as where the first segment of any file can to be much smaller than other segments of the same file. For example, a media content file of 50 MB can be broken down into segments of 5 MB, 15 MB, 15 MB, and 15 MB, each defined by a corresponding byte offset range.

At block 430, method 400 sends at least a portion of the plurality of smaller segments to the one or more mesh nodes in the wireless mesh network. In one embodiment, content management service 140 sends a content command to at least one of the one or more mesh nodes 370 or 380 in the wireless mesh network 360, the command comprising the content location reference (e.g., origin URL) and one of the plurality of byte offset ranges. The receiving node 370 or 380 can perform a hypertext transfer protocol (HTTP) operation (e.g., a GET operation) to fetch, from the cloud storage location, the one of the plurality of smaller segments of the media content file identified by the origin URL and the one of the plurality of byte offset ranges.

Figure 5:
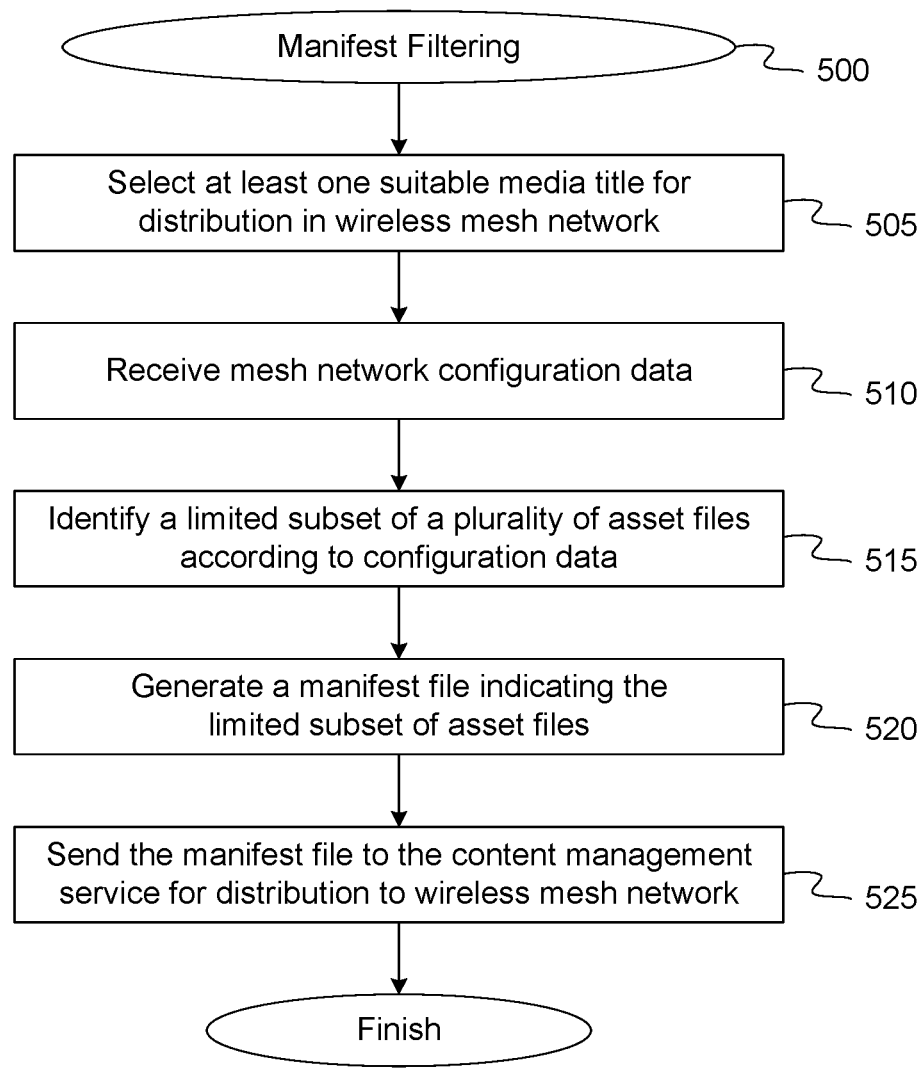
FIG. 5 is a flow diagram illustrating a method of manifest filtering in a wireless mesh network, according to an embodiment.

FIG. 5 is a flow diagram illustrating a method of manifest filtering in a wireless mesh network, according to an embodiment. The method 500 may be performed by processing logic that comprises hardware (e.g., circuitry, dedicated logic, programmable logic, microcode, etc.), software, firmware, or a combination thereof. In one embodiment, method 500 may be performed by media provider service 130 and content management service 140, as shown in FIGS. 1 and 3.

Referring to FIG. 5, at block 505, method 500 selects at least one media title available from the one or more media content providers 307 that is suitable for distribution to the one or more mesh nodes 370, 380 in the wireless mesh network 360. As described above, media provider service 130 may consider the global and local popularity of media titles and/or may make a prediction of which media titles are most likely to be requested by users of the wireless mesh network 360.

At block 510, method 500 receives mesh network configuration data from the one or more mesh nodes 370, 380 in the wireless mesh network 360. In one embodiment, the mesh network configuration data includes certain attributes of the mesh nodes 370, 380 including, for example, at least one of a streaming protocol, resolution, encoding scheme, bit-rate, audio format, or language supported by the one or more mesh nodes 370, 380 in the wireless mesh network 360.

At block 515, method 500 identifies a limited subset of a plurality of media content files associated with the selected media title. In one embodiment, the limited subset corresponds to the attributes indicated in the mesh network configuration data and excludes media content files of the plurality of media content files corresponding to attributes not supported by the one or more mesh nodes 370, 380 in the wireless mesh network 360. A given media title may have a number of individual asset files, each associated with a different attribute. For example, there may be a separate file for each of a plurality of video resolutions (e.g., 720p, 1080p, etc.). In one embodiment, the mesh network configuration data may indicate, however, that all of the mesh clients associated with mesh nodes 370 and 380 only support a maximum resolution of 720p for video playback. Accordingly, media provider service 130 can recognize that the asset files for video resolutions of 1080p and higher need not be included in the limited subset. A similar determination can be made for each of the other attributes in the mesh network configuration data.

At block 520, method 500 generates a manifest file indicating the limited subset of the plurality of media content files. By filtering out asset files corresponding to attributes that are not supported by the mesh nodes 370 and 380 in wireless mesh network 360, media provider service 130 can reduce the size of the manifest file and reduce the size of resources (e.g., media content asset files) that are stored on the mesh nodes 370 and 380. This can be advantageous given the limited storage capacity of the distributed cache 374 and 384 on the mesh nodes 370 and 380.

At block 525, method 500 sends the manifest file to the content management service 140. The content management service 140 can retrieve the limited subset of the plurality of media content files and distribute the limited subset of the plurality of media content files to the one or more mesh nodes 370, 380 in the wireless mesh network 360.

Figure 6:
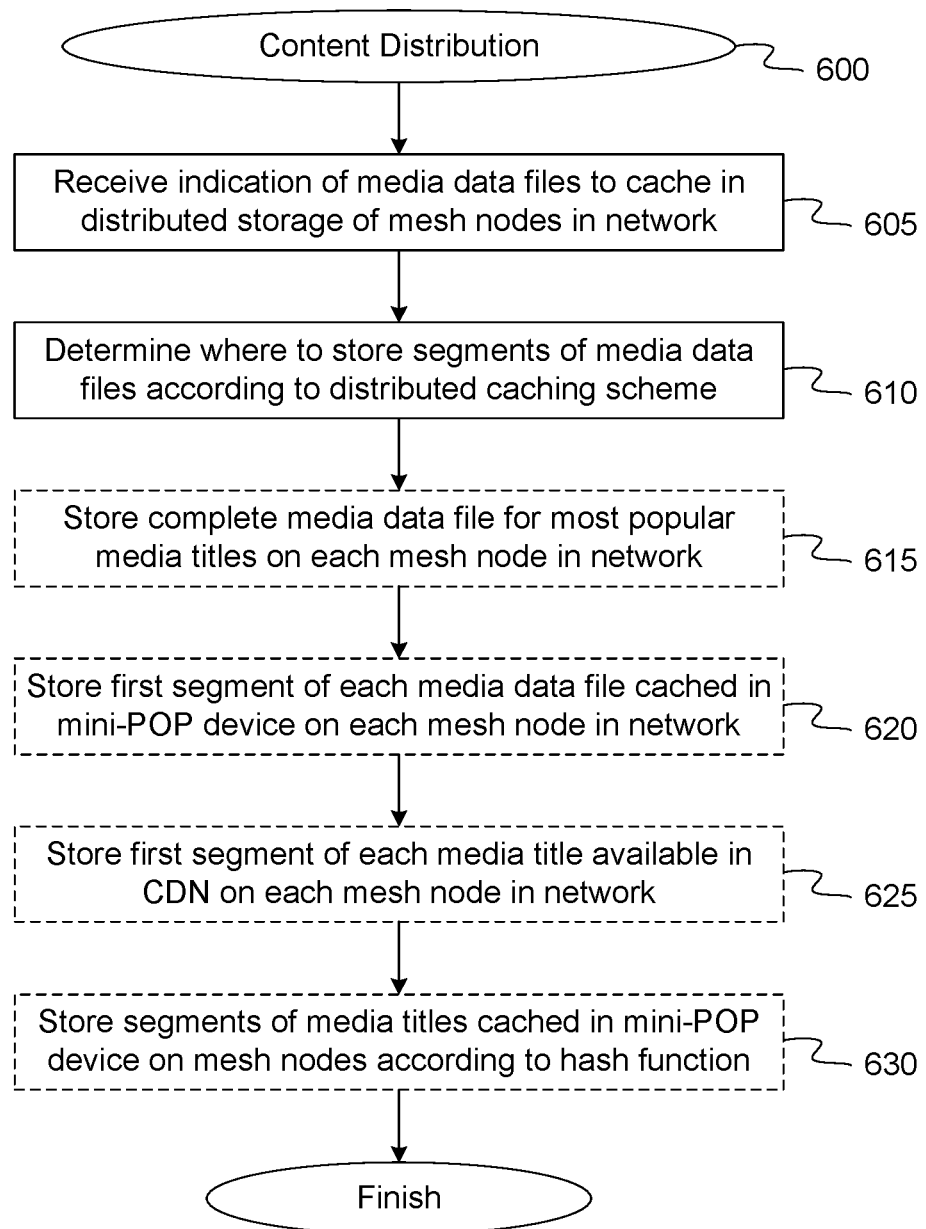
FIG. 6 is a flow diagram illustrating a method of content distribution in a wireless mesh network, according to an embodiment.

FIG. 6 is a flow diagram illustrating a method of content distribution in a wireless mesh network, according to an embodiment. The method 600 may be performed by processing logic that comprises hardware (e.g., circuitry, dedicated logic, programmable logic, microcode, etc.), software, firmware, or a combination thereof. In one embodiment, method 600 may be performed by mesh nodes 370 and 380, as shown in FIG. 3.

Referring to FIG. 6, at block 605, method 600 receives an indication of the subset of the plurality of media titles to cache in the distributed storage system of the mesh nodes 370, 380 in the wireless mesh network 360. In one embodiment, content management service 140 receives the indication of one or more media titles from media provider service 130 which selected the media titles from those available from content providers 307. As described above, media provider service 130 may consider the global and local popularity of media titles and/or may make a prediction of which media titles are most likely to be requested by users of the wireless mesh network 360.

At block 610, method 600 determines where to store each of the plurality of smaller segments among the one or more mesh nodes in the wireless mesh network according to a distributed caching scheme. In one embodiment, the distributed caching scheme may include any one or more of the options described below with respect to blocks 615-630.

At block 615, method 600 optionally stores a complete media content file for a fixed number of the subset of the plurality of media titles on each of the one or more mesh 370, 380 in the wireless mesh network 360. These may include the most popular media titles, the most recently added media titles, the media titles deemed most likely to be requested by media provider service 130, or some other media titles.

At block 620, method 600 optionally stores on each of the one or more mesh nodes 370, 380 in the wireless mesh network 360, a first temporal segment of each media content file that is fully cached on at least one mesh node (e.g., mini-POP device 102) in the wireless mesh network 360. In one embodiment, although the entire media content file is stored on or across one or more devices in the wireless mesh network 360, the first temporal segment or segments (i.e., those that would be played first when playback of the corresponding media title is initiated) may be stored on each mesh node 370 and 380. In this manner, playback of the media title can be initiated relatively soon after a request for playback is received (i.e., the time to first frame is reduced). While playback of the first temporal segment or segments is begun from the local copy, the mesh node 370 or 380 can retrieve the remaining segments of the media content file from the other nodes in wireless mesh network 360 on which they are stored.

At block 625, method 600 optionally stores on each of the one or more mesh nodes 370, 380 in the wireless mesh network 360, a first temporal segment of a media content file for each of the plurality of media titles available from the one or more video content providers 307. Similar to block 620, the first temporal segment or segments can be delivered from the local cache so that playback can begin while the mesh node obtains the remaining segments of the media content file. In another embodiment, the first temporal segment or segments that are stored locally can be played as a "preview" of the media title to assist the user in determining whether they wish to request playback of the entire media title.

At block 630, method 600 optionally stores, on the one or more mesh nodes 370, 380 in the wireless mesh network 360 and according to a hash function, segments of media content files that are fully cached on at least one mesh node (e.g., mini-POP device 102) in the wireless mesh network 360. In one embodiment, there are individual nodes (e.g., mini-POP device 102 or another one of mesh nodes 104, 106, 108, 110) that store full copies of designated media content files. Other nodes that do not have full copies can retrieve certain segments from those nodes, as needed in response to a request from a media client. The nodes that do not have full copies of the media file may still contain certain segments of the media file, as described above. The hash function can define how those segments are distributed among the mesh nodes. In one embodiment, the hash function can be customized for each individual media file, but generally the hash function seeks to distribute the segments in such a fashion so as to place content segments physically closer to where it is likely to be requested in order to reduce inter-node bandwidth usage and to achieve a certain level replication so that requests for content can be serviced in the event that a certain node or network communication link goes down or is otherwise unavailable.

Figure 7:
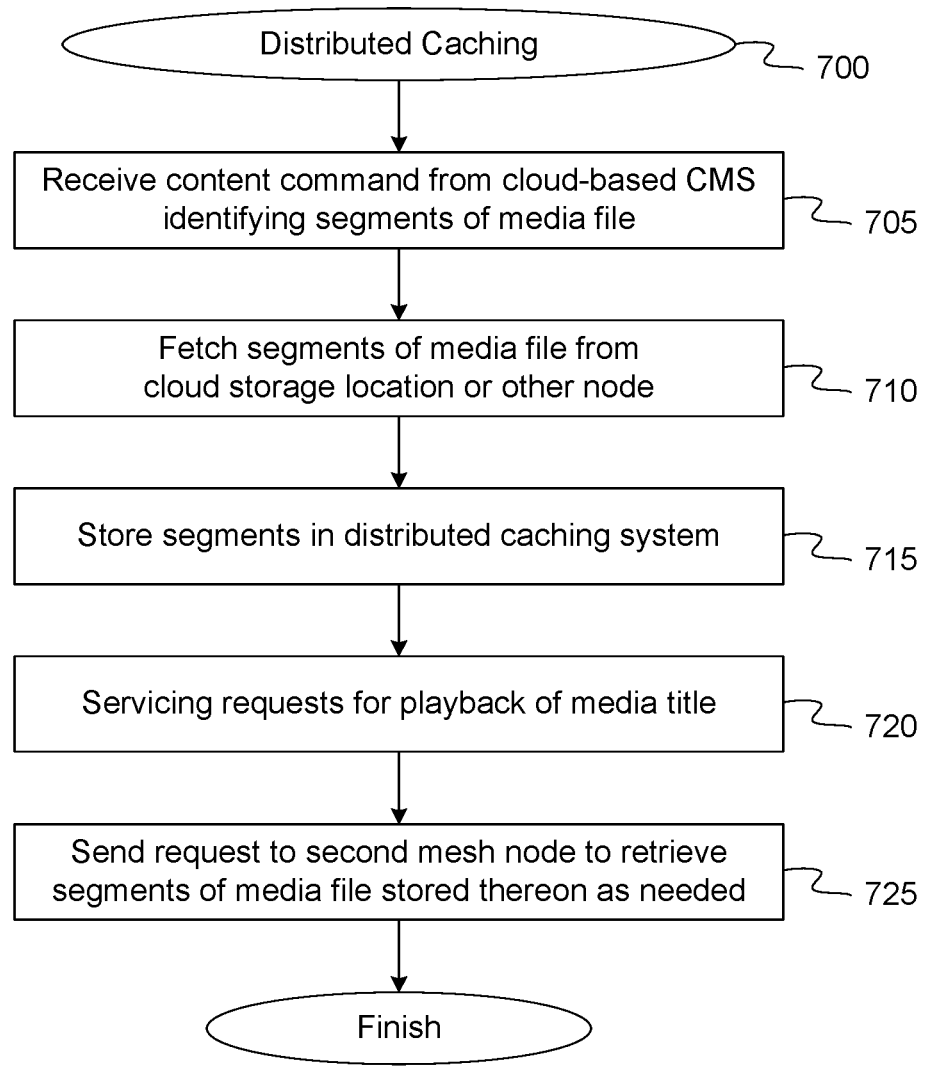
FIG. 7 is a flow diagram illustrating a method of distributed caching of media content in a wireless mesh network, according to an embodiment.

FIG. 7 is a flow diagram illustrating a method of distributed caching of media content in a wireless mesh network, according to an embodiment. The method 700 may be performed by processing logic that comprises hardware (e.g., circuitry, dedicated logic, programmable logic, microcode, etc.), software, firmware, or a combination thereof. In one embodiment, method 700 may be performed by mesh nodes 370 and 380, as shown in FIG. 3.

Referring to FIG. 7, at block 705, method 700 receives a content command from a content management service 140 communicatively coupled to the wireless mesh network 360. In one embodiment, a first mesh node 370 in the wireless mesh network 360 receives the content command which identifies one or more segments of a media content file corresponding to a media title to be stored on the first mesh node 370. In one embodiment, the content command includes an origin uniform resource locator (URL) associated with the media content file which indicates a cloud storage location from which the media content file can be retrieved, and one of a plurality of byte offset ranges corresponding to the one or more segments of the media content file.

At block 710, the method 700 fetches, from the cloud storage location, the one or more segments of the media content file identified by the origin URL and the one of the plurality of byte offset ranges. In one embodiment, content update agent 371 performs a hypertext transfer protocol (HTTP) GET operation by passing the original URL and the byte offset range to the cloud storage location to fetch the one or more segments of the media content file. In one embodiment, method 700 fetches the one or more segments of the media content file from another node in the mesh network 100. For example, certain segments may be replicated across multiple nodes in the mesh network 100. In these situations, the content update agent 371 can fetch the segments from that node directly using mesh communication component 375 rather than traversing the limited bandwidth backhaul connection between the mesh cluster 360 and the cloud storage location.

At block 715, method 700 stores, in a distributed caching system 374 on the first mesh node 370, the one or more segments of the media content file specified in the content command. In one embodiment, the distributed caching system 374 on the first mesh node 370 stores at least one segment of the media content file that is not stored in a distributed caching system 384 on a second mesh node 380 in the wireless mesh network 360. In one embodiment, content update agent 371, via content daemon 373 further stores, in the distributed caching system 374 on the first mesh node 370, a first segment of a second media content file, wherein remaining segments of the second media content file are stored in the distributed caching system 384 on the second mesh node 380 in the wireless mesh network 360.

At block 720, method 700 services requests for playback of the media title from one or more mesh clients 376, 377 communicatively coupled to the first mesh node 370. As part of that process, if a segment is not available locally on the first mesh node 370, at block 725, method 700 sends a request to the second mesh node 380 in the wireless mesh network 360 to retrieve a segment of the media content file stored on the second mesh node 380. Additional details of the process of servicing these playback requests are provided below with respect to FIG. 8.

Figure 8:
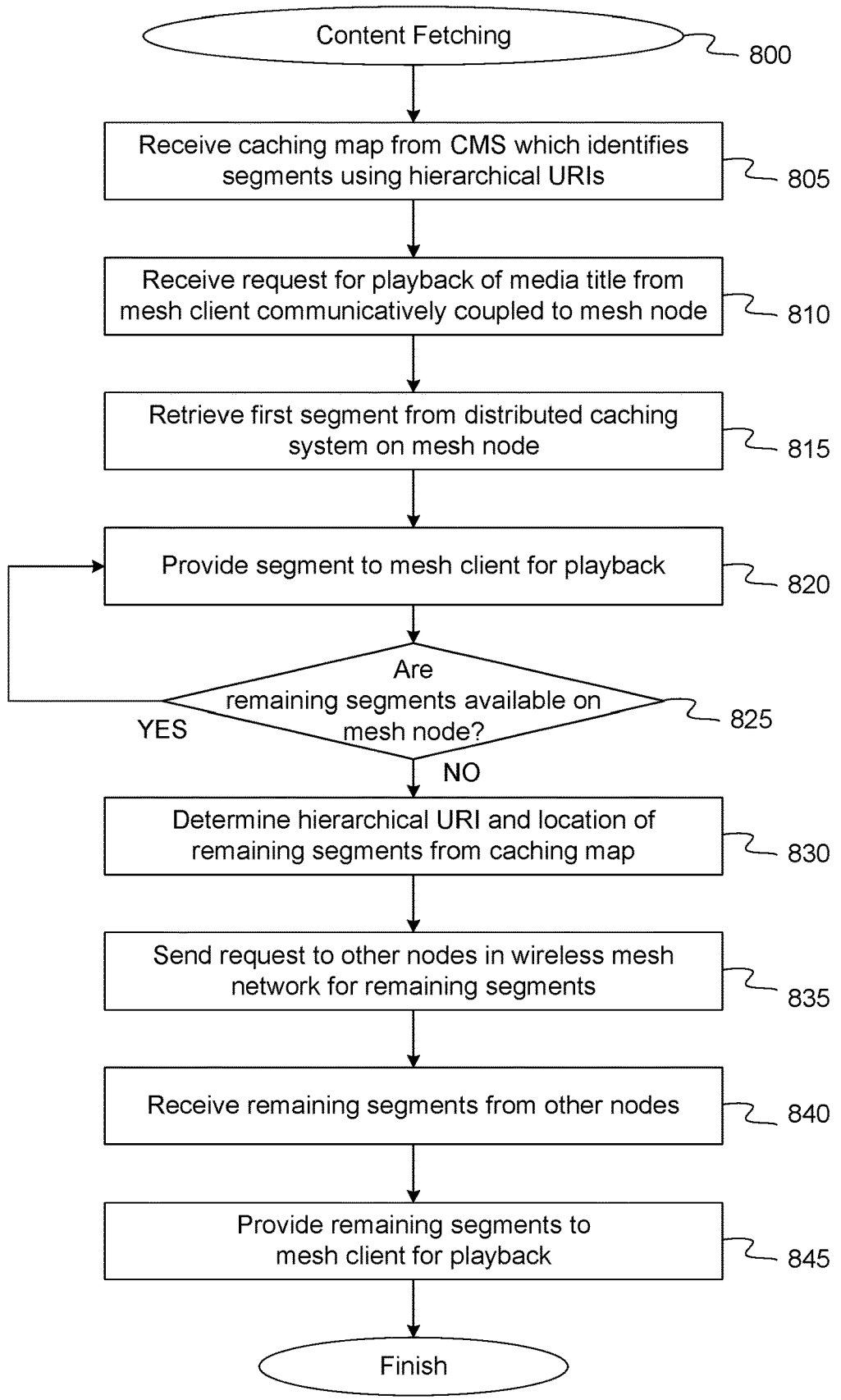
FIG. 8 is a flow diagram illustrating a method of content fetching from a distributed caching system in a wireless mesh network, according to an embodiment.

FIG. 8 is a flow diagram illustrating a method of content fetching from a distributed caching system in a wireless mesh network, according to an embodiment. The method 800 may be performed by processing logic that comprises hardware (e.g., circuitry, dedicated logic, programmable logic, microcode, etc.), software, firmware, or a combination thereof. In one embodiment, method 800 may be performed by mesh nodes 370 and 380, as shown in FIG. 3.

Referring to FIG. 8, at block 805, method 800 receives a caching map from content management service 140. In one embodiment, the first mesh node 370 receives the caching map which identifies one or more segments of a media content file to be cached in the wireless mesh network 360 using a uniform resource indicator (URI) to uniquely identify each segment. Depending on the embodiment, the URI may be a named data networking (NDN) style URI, or some other hierarchically structured URI that identifies an owner of the content.

At block 810, method 800 receives a request for playback of the media title from a first mesh client 376 of one or more mesh clients communicatively coupled to the first mesh node 370. The first mesh client 376 may be for example, a personal computer (PC), a tablet PC, a set-top box (STB), a Personal Digital Assistant (PDA), a cellular telephone, a smart phone, or some other computing device capable of playback of media content. The request may be initiated by a user of first mesh client 376 which is coupled to the first mesh node 370 by a N2C wireless connection.

At block 815, method 800 retrieves a first segment of the media content file corresponding to the media title from the distributed caching system 374 on the first mesh node 370. Using the caching map, content server 372 can determine that the first segment is stored locally in the distributed cache 374 on mesh node 370. In one embodiment, content server 372 invokes content daemon 373 to retrieve the first segment from distributed cache 374. In one embodiment, if the caching map does not include an indication of where a certain segment is stored, content server 372 can use mesh communication component 375 to broadcast a request to neighboring nodes in the cluster 360 for the content segment. In another embodiment, content server 372 can use mesh communication component 375 to send a directed request to a dedicated node in the cluster 360 which is responsible for locating the requested segment.

At block 820, method 800 sends the first segment of the media content file to the first mesh client 376 for playback. In one embodiment, content daemon 373 passes the first segment back to content server 372 which provides the first segment to the first mesh node 370 over the N2C wireless connection.

At block 825, method 800 determines whether the remaining segments of the media content file are present in the distributed caching system 374 on the first mesh node 370. In one embodiment, content server 372 again uses the caching map to identify the locations of the remaining segments identified by the unique NDN style URIs. If the segments are present locally, content server 372 can retrieve those segments form distributed cache 374 and continue to send the remaining segments of the media content file to the first mesh client 376 for playback.

If the remaining segments of the media content file are not present in the distributed caching system 374 on the first mesh node 370, at block 830, method 800 determines the a hierarchical URI (e.g., an NDN style URI) corresponding to each remaining segment of the media content file and determines a location in the wireless mesh network 360 of each remaining segment from the caching map. At block 835, method 800 sends a request for each remaining segment to other mesh nodes (e.g., mesh node 880) in the wireless mesh network 860, the request identifying each remaining segment by the corresponding hierarchical URI. In one embodiment, mesh communication component 375 in first mesh node 370 can communicate with mesh communication component 385 on mesh node 380 (e.g., using the 802.11s protocol) to exchange requests and media content data. At block 840, method 800 receives each remaining segment from the other mesh nodes (e.g., mesh node 380) and at block 845, method 800 sends each remaining segment to the first mesh client 376 for playback.

Figure 9:
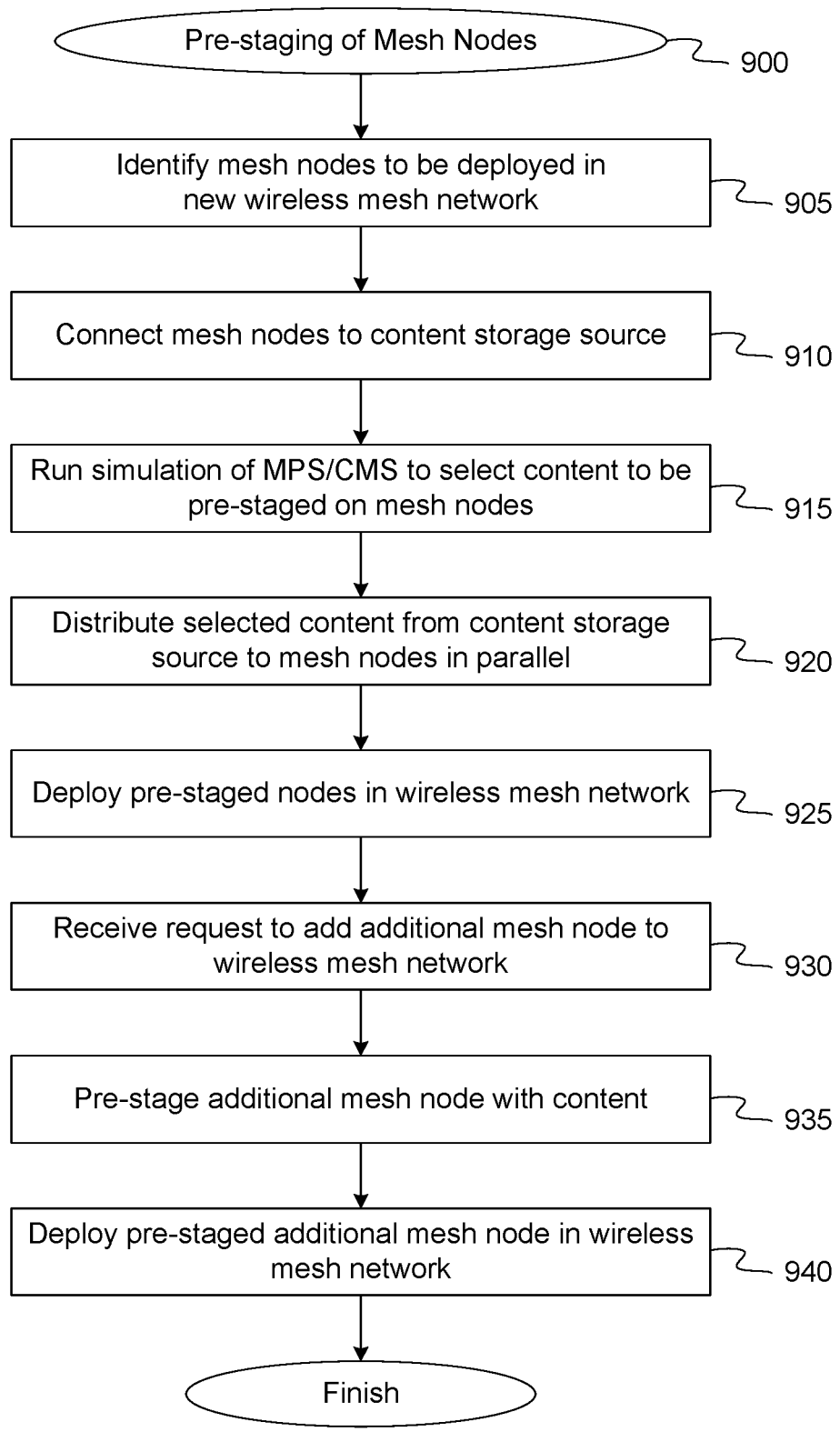
FIG. 9 is a flow diagram illustrating a method of pre-staging mesh nodes with content prior to deployment in a wireless mesh network, according to an embodiment.
Figure 10:
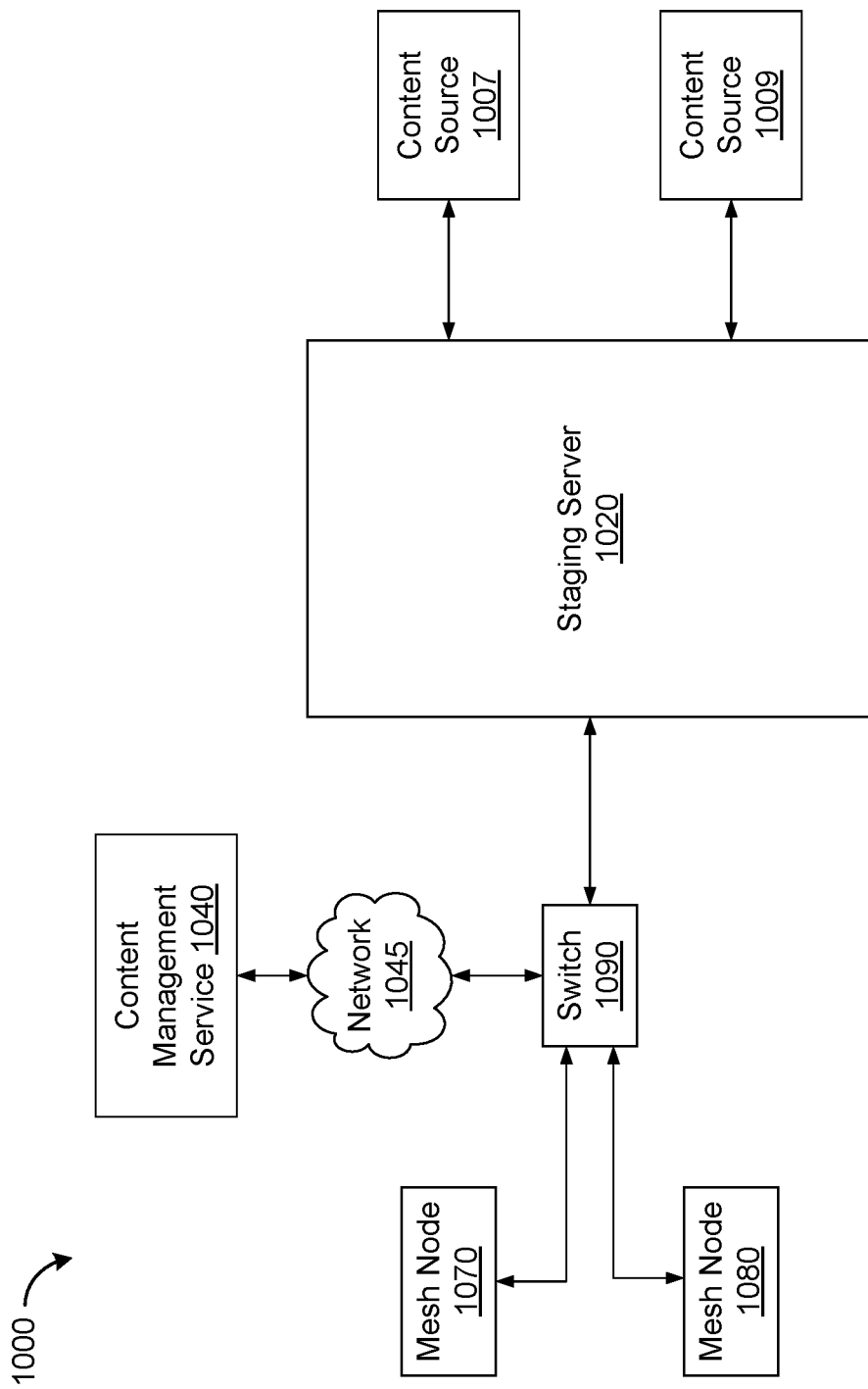
FIG. 10 is a block diagram illustrating a system for pre-staging mesh nodes with content prior to deployment in a wireless mesh network, according to an embodiment.

FIG. 9 is a flow diagram illustrating a method of pre-staging mesh nodes with content prior to deployment in a wireless mesh network, according to an embodiment. The method 900 may be performed by processing logic that comprises hardware (e.g., circuitry, dedicated logic, programmable logic, microcode, etc.), software, firmware, or a combination thereof. In one embodiment, method 900 may be performed by pre-staging system 1000, as shown in FIG. 10.

Referring to FIG. 9, at block 905, method 900 identifies one or more new mesh nodes 1070 and 1080 to be deployed in a wireless mesh network. In one embodiment, the new mesh nodes 1070 and 1080 may be part of a newly created wireless mesh network that has not been previously deployed. In another embodiment, the new mesh nodes 1070 and 1080 are being added to an existing wireless mesh network.

At block 910, method 900 connects the mesh nodes 1070 and 1080 to content storage sources 1007 and 1009. In one embodiment, content storage sources 1007 and 1009 include drives having media content files stored thereon corresponding to one or more media titles. The content storage sources 1007 and 1009 may be internal to or external to a staging server 1020 and the mesh nodes 1070 and 1080 may be connected to staging server 1020 directly or through a wired Ethernet switch 1090. In one embodiment, rather than entire mesh nodes 1070 and 180 being connected to storage sources 1007 and 1009, instead only storage drives may be connected, such that those drives can be later inserted into the full mesh nodes before deployment in the field.

At block 915, method 900 runs a simulation of the cloud-based media provider service and content management service 1040 to identify one or more media titles having corresponding media content files on content storage sources 1007 and 1009 and distribute them to mesh nodes 1070 and 1080. In one embodiment, content management service 1040 is coupled to switch 1090 through a network 1045.

At block 920, method 900 distributes the selected media content files to mesh nodes 1070 and 1080 in parallel. Since mesh nodes 1070 and 1080 are connected to content storage sources 1007 and 1009 over a high-speed and high-bandwidth wired connection, there is minimal latency associated with transferring the media content files from content storage sources 1007 and 1009 to mesh nodes 1070 and 1080. In one embodiment, there is significantly less latency than would be present if the media content files were transferred to mesh nodes 1070 and 1080 after they had been deployed in the wireless mesh network.

At block 925, method 900 deploys the mesh nodes 1070 and 1080 in the wireless mesh network. In one embodiment, the mesh nodes 1070 and 1080 are disconnected from switch 1090, sent to the customer location and connected to a wireless mesh network, such as network 100 illustrated in FIG. 1 or network 360 illustrated in FIG. 3.

At block 930, method 900 receives a request to add a new mesh node to the existing wireless mesh network. The request may be received from a customer or system administrator of the wireless mesh network. At block 935, method 900 pre-stages the new mesh node with at least one segment of at least one media content file using the process described above at blocks 910-920. At block 940, method 900 deploys the new pre-staged mesh node to the existing wireless mesh network.

Figure 11:
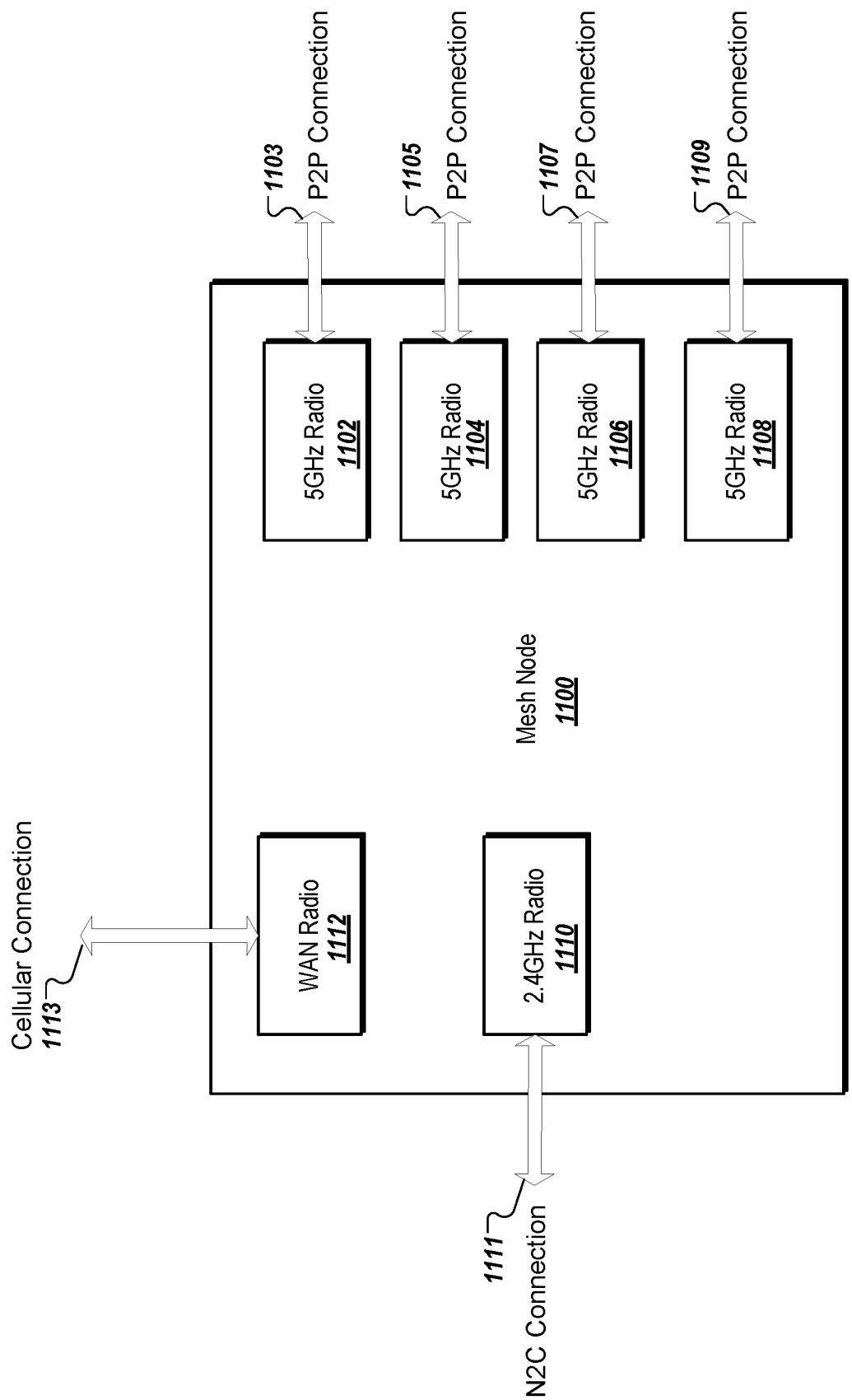
FIG. 11 is a block diagram of a mesh node with multiple radios according to one embodiment.

FIG. 11 is a block diagram of a mesh node 1100 with multiple radios according to one embodiment. The mesh node 1100 includes a first 5 GHz radio 1102, a second 5 GHz radio 1104, a third 5 GHz radio 1106, a fourth 5 GHz radio 1108, a 2.4 GHz radio 1110, and a cellular radio 1112. The first 5 GHz radio 1102 creates a first P2P wireless connection 1103 between the mesh node 1100 and another mesh node (not illustrated) in a mesh network. The second 5 GHz radio 1104 creates a second P2P wireless connection 1105 between the mesh node 1100 and another mesh node (not illustrated) in the mesh network. The third 5 GHz radio 1106 creates a third P2P wireless connection 1107 between the mesh node 1100 and another mesh node (not illustrated) in the mesh network. The fourth 5 GHz radio 1108 creates a fourth P2P wireless connection 1109 between the mesh node 1100 and another mesh node (not illustrated) in the mesh network. The 2.4 GHz radio 1110 creates a N2C wireless connection 1111 between the mesh node 1100 and a client consumption device (not illustrated) in the mesh network. The N2C wireless connection may be one of a second set of one or more WLAN connections that operate at a second frequency of approximately 2.4 GHz. The cellular radio 1112 creates a cellular connection between the mesh node 1100 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 1100 may be any one of the mesh network device described herein. In one embodiment, the mesh node 1100 may be an ingress node or a mini-POP node that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 1100 may receive a first request for a first content file from the first client consumption device over the first N2C connection 1111. The mesh node 1100 sends a second request for the first content file to a second network hardware device through the network backbone via a first set of zero or more intervening network hardware devices between the first network hardware device and the second network hardware device. The mesh node 1100 receives the first content file through the network backbone via the first set of zero or more intervening network hardware devices and sends the first content file to the first client consumption device over the first N2C connection 1111. In a further embodiment, the mesh node 1100 includes the WAN radio 1112 to wirelessly connect to a MNCS device by a cellular connection 1113 to exchange control data.

In some embodiments, a path between the mesh node 1100 and an ingress node (or any other mesh network device) could include zero or more hops of intervening network hardware devices. In some cases, the path may include up to 12-15 hops within a mesh network of 100×100 network hardware devices deployed in the mesh network. In some embodiments, a number of network hardware devices in the mesh network is greater than fifty. The mesh network may include hundreds, thousands, and even tens of thousands of network hardware devices.

In some embodiments, the mesh node 1100 includes memory to store content files, control and command data, as well as the aggregate data described herein. The memory of the first network hardware device may be volatile memory, non-volatile memory, or a combination of both. When a content file is not stored in the memory or the storage of the mesh node 1100, the mesh node 1100 generates and sends a request to another node in the mesh network. Intervening network hardware devices can make similar determinations to locate the content file in the mesh network. In the event that the first content file is not stored in the mesh network, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 1103, 1105, 1107, 1109 are WLAN connections that operate in a first frequency range and the N2C connections 1111 are WLAN connections that operate in a second frequency range. In another embodiment, the P2P wireless connections 1103, 1105, 1107, 1109 operate at a first frequency of approximately 5.0 GHz and the N2C connections 1111 operate at a second frequency of approximately 2.4 GHz.

Figure 12:
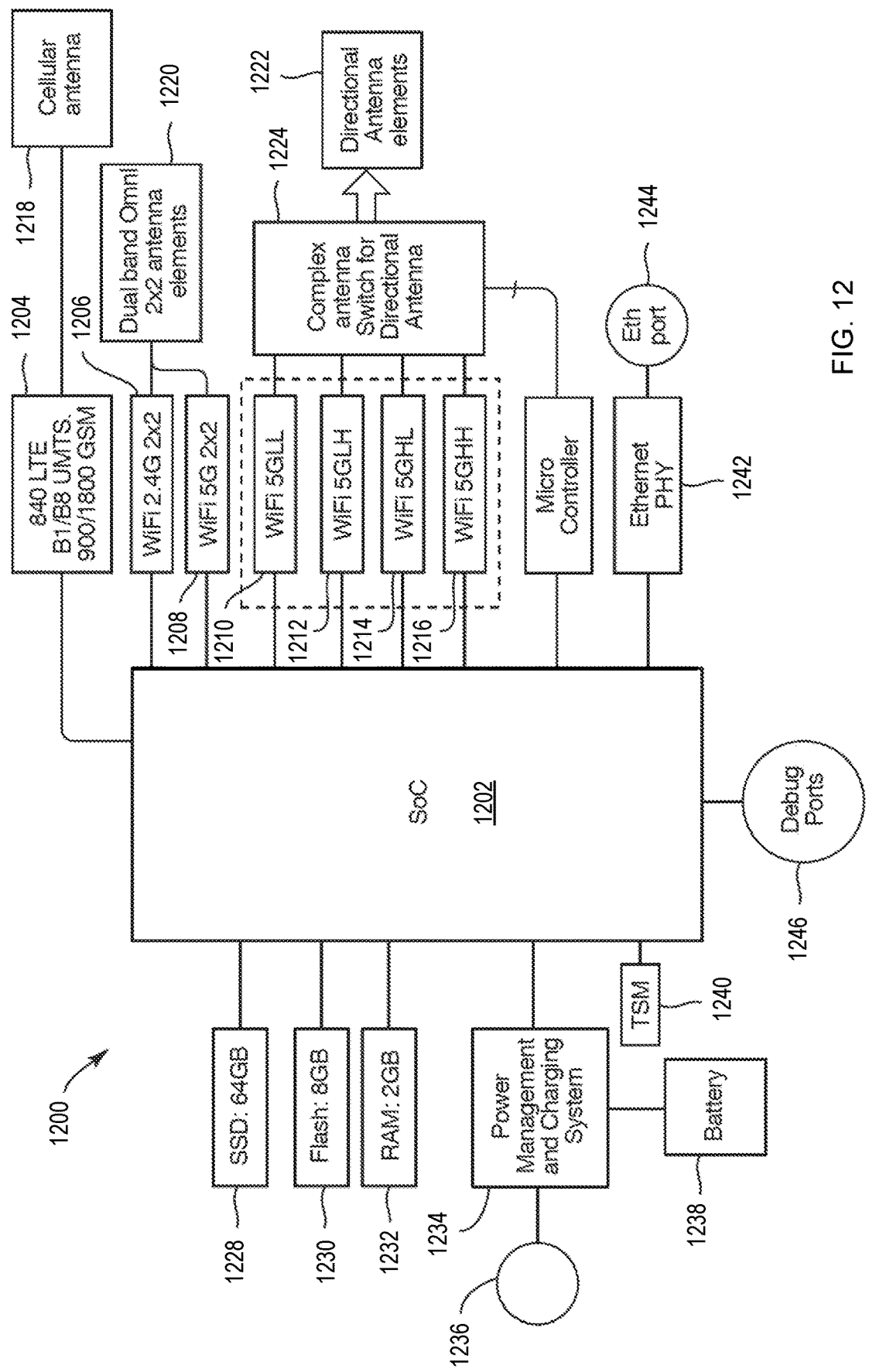
FIG. 12 is a block diagram of a mesh network device according to one embodiment.

FIG. 12 is a block diagram of a mesh network device 1200 according to one embodiment. The mesh network device 1200 may be one of many mesh network devices organized in a mesh network (e.g., mesh network 100). The mesh network device 1200 is one of the nodes in a mesh topology in which the mesh network device 1200 cooperates with other mesh network devices in distribution of content files to client consumption devices in an environment of limited connectivity to broadband Internet infrastructure, as described herein. The mesh network device 1200 may be the mini-POP node 102 of FIG. 1. Alternatively, the mesh network device 1200 may be any one of the mesh network devices 102, 104, 106, 108, and 110 of FIG. 1. In another embodiment, the mesh network device 1200 is any one of the network hardware devices 210-230 of FIG. 2.

The mesh network device 1200 includes a system on chip (SoC) 1202 to process data signals in connection with communicating with other mesh network devices and client consumption devices in the mesh network. The SoC 1202 includes a processing element (e.g., a processor core, a central processing unit, or multiple cores) that processes the data signals and controls the radios to communicate with other devices in the mesh network. In one embodiment, the SoC 1202 is a dual core SoC, such as the ARM A15 1.5 GHz with hardware network acceleration. The SoC 1202 may include memory and storage, such as 2 GB DDR RAM and 64 GB eMMC coupled to the SoC 1202 via external HDD interfaces (e.g., SATA, USB3, or the like). The SoC 1202 can implement processing logic comprising software, firmware, hardware, or any combination thereof. The SoC 1202 may include multiple RF interfaces, such as a first interface to the first RF module 1204 (e.g., HSCI interface for cellular module (3G)), a second interface to the WLAN 2.4 GHz radio 1206, a third interface to the WLAN 2.4 GHz radio 1208, and multiple interfaces to the WLAN 5 GHz radios, such as on a PCIe bus. In one embodiment, the SoC 1202 is the IPQ8064 Qualcomm SoC or the IPQ4029 Qualcomm SoC. Alternatively, other types of SoCs may be used, such as the Annapurna SoC, or the like. Alternatively, the mesh network device 1200 may include an application processor that is not necessarily considered to be a SoC.

The mesh network device 1200 may also include memory and storage. For example, the mesh network device 1200 may include SSD 64 GB 1228, 8 GB Flash 1230, and 2 GB 1232. The memory and storage may be coupled to the SoC 1202 via one or more interfaces, such as USB 3.0, SATA, or SD interfaces. The mesh network device 1200 may also include a single Ethernet port 1244 that is an ingress port for Internet Protocol (IP) connection. The Ethernet port 1244 is connected to the Ethernet PHY 1242, which is connected to the SoC 1202. The Ethernet port 1244 can be used to service the mesh network device 1200. Although the Ethernet port 1244 could provide wired connections to client consumption devices, the primary purpose of the Ethernet port 1244 is not to connect to client consumption devices, since the 2.4 GHz connections are used to connect to client consumption devices in the mesh network. The mesh network device 1200 may also include one or more debug ports 1246, which are coupled to the SoC 1202. The memory and storage may be used to cache content, as well as store software, firmware or other data for the mesh network device 1200.

The mesh network device 1200 may also include a power curation and charging system 1234. The power management and charging system 1234 can be connected to a power supply 1236 (e.g., 240V outlet, 120V outlet, or the like). The power management and charging system 1234 can also connect to a battery 1238. The battery 1238 can provide power in the event of power loss. The power management and charging system 1234 can be configured to send a SoS message on power outage and backup system state. For example, the WLAN radios can be powered down, but the cellular radio can be powered by the battery 1238 to send the SoS message. The battery 1238 can provide limited operations by the mesh network device 1200, such as for 10 minutes before the entire system is completely powered down. In some cases, power outage will likely affect a geographic area in which the mesh network device 1200 is deployed (e.g., power outage that is a neighborhood wide phenomenon). The best option may be to power down the mesh network device 1200 and let the cloud service (e.g., back end service) know of the outage in the mesh network. The power management and charging system 1234 may provide a 15V power supply up to 21 watts to the SoC 1202. Alternatively, the mesh network device 1200 may include more or less components to operate the multiple antennas as described herein.

The mesh network device 1200 includes a first radio frequency (RF) module 1204 coupled between the SoC 1202 and a cellular antenna 1218. The first RF module 1204 supports cellular connectivity using the cellular antenna 1218. In one embodiment, the cellular antenna 1218 includes a primary wide area network (WAN) antenna element and a secondary WAN antenna element. The first RF module 1204 may include a modem to cause the primary WAN antenna, the secondary WAN antenna, or both to radiate electromagnetic energy in the 1200 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, metadata download, or the like. Alternatively, the first RF module 1204 may support other bands, as well as other cellular technologies. The mesh network device 1200 may include a GPS antenna and corresponding GPS module to track the location of the mesh network device 1200, such as moves between homes. However, the mesh network device 1200 is intended to be located inside a structure, the GPS antenna and module may not be used in some embodiments.

The mesh network device 1200 includes a first set of wireless local area network (WLAN) modules 1206, 1208 coupled between the SoC 1202 and dual-band omnidirectional antennas 1220. A first WLAN module 1206 may support WLAN connectivity in a first frequency range using one of the dual-band omnidirectional antennas 1220. A second WLAN module 1208 may support WLAN connectivity in a second frequency range using one of the dual-band omnidirectional antennas 1220. The dual-band omnidirectional antennas 1220 may be two omnidirectional antennas for 2.4 GHz. The directional antennas 1222 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 1220 and the directional antennas 1222 can be implemented within a fully switchable antenna architecture controlled by micro controller 1226. For example, each 5 GHz radio can choose any 2 sectors (for 2 2×2 MU-MIMO streams).

The mesh network device 1200 includes a second set of WLAN modules 1210-1216 coupled between the SoC 1202 and antenna switching circuitry 1224. The second set of WLAN modules 1210-1216 support WLAN connectivity in the second frequency range using a set of directional antennas 1222. The second set of WLAN modules 1210-1216 is operable to communicate with the other mesh network devices of the mesh network. The antenna switching circuitry 1224 is coupled to a micro controller 1226. The micro controller 1226 controls the antenna switching circuitry 1224 to select different combinations of antennas for wireless communications between the mesh network device 1200 and the other mesh network devices, the client consumption devices, or both. For example, the micro controller 1226 can select different combinations of the set of directional antennas 1222.

In another embodiment, a filter switch bank is coupled between the antenna switching circuitry 1224 and the second set of WLAN modules 1210-1216. In another embodiment, the filter switch bank can be implemented within the antenna switching circuitry 1224.

In the depicted embodiment, the first set of WLAN modules include a first a first 2×2 2.4 GHz MIMO radio 1206 and a 2×2 5 GHz MIMO radio 1208. The second set of WLAN modules includes a first 2×2 5 GHz MIMO radio 1210 ("5GLL"), a second 2×2 5 GHz MIMO radio 1212 ("5GLH"), a third 2×2 5 GHz MIMO radio 1214 ("5GHL"), and a fourth 2×2 5 GHz MIMO radio 1216 ("5GHH"). The dual-band omnidirectional antennas 1220 may include a first omnidirectional antenna and a second omnidirectional antenna (not individually illustrated in FIG. 12). The set of directional antennas 1222 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 1200 can handle antenna switching in a static manner. The SoC 1202 can perform sounding operations with the WLAN radios to determine a switch configuration. Switching is not done on a per packet basis or at a packet level. The static switch configuration can be evaluated a few times a day by the SoC 1202. The SoC 1202 can include the intelligence for switching decision based on neighbor sounding operations done by the SoC 1202. The micro controller 1226 can be used to program the antenna switching circuitry 1224 (e.g., switch matrix) since the mesh network device 1200 may be based on CSMA-CA, not TDMA. Deciding where the data will be coming into the mesh network device 1200 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 1200 can adapt a beam patter to be essentially fixed since the mesh network devices are not intended to move once situated.

In one embodiment, the antenna switching circuitry 1224 includes multiple diplexers and switches to connect different combinations of antennas to the multiple radios. One configuration for the antenna switching circuitry 1224 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the network device 1200.

Figure 13:
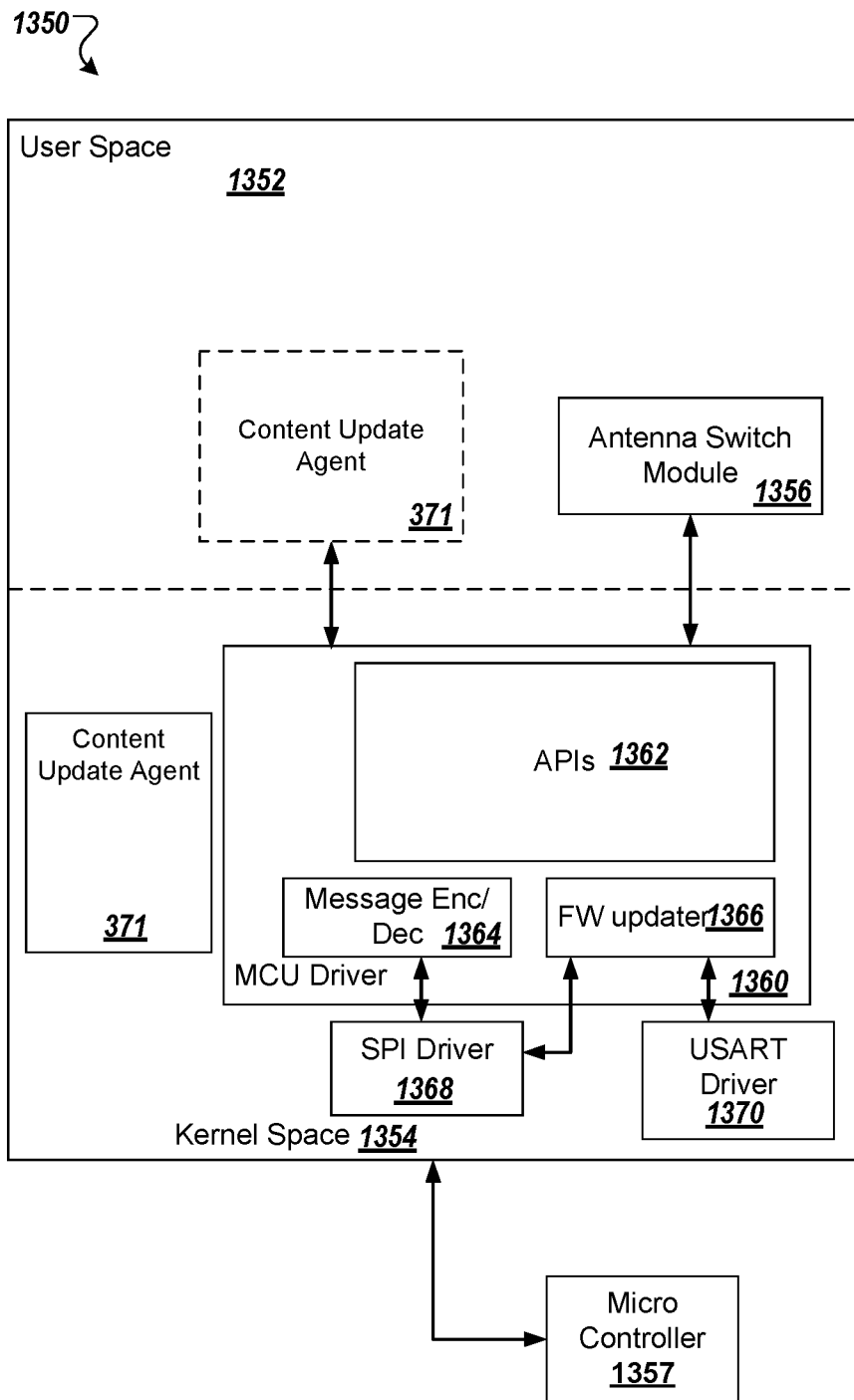
FIG. 13 is a block diagram of an application processor in which the embodiments of the present disclosure may be implemented.

FIG. 13 is a block diagram of an application processor in which the content update agent 371 operates in accordance with embodiments of the present disclosure may be implemented. The application processor 1350 executes an operating system that segregates memory (virtual memory) into user space 1352 and kernel space 1354. In this embodiment, the content update agent 371 runs in the user space 1352. In other embodiments, some or the entire content update agent 371 can be implemented in the kernel space 1354. The content update agent 371 may be instructions that when executed by the application processor 1350 perform various gateway selection operations as described herein. The application processor 1150 can communicate with neighbor network devices to route data traffic on a network backbone of multiple P2P wireless connections between the network devices.

In the kernel space 1154, a micro controller unit (MCU) driver 1160 can execute. The MCU driver 1160 may include multiple application programming interfaces (APIs) 1162 to interface to other components, such as the radios and micro controller, as described herein. The APIs 1162 can communicate messages to other components and may use a message encoder/decoder 1164 to encode and decode these messages. The APIs 1162 may include an API for getting firmware versions, an API for updating the firmware, and an API for getting radio information (e.g., radio configuration, antenna configuration, channel information, chamber/sector information, or the like). The MCU driver 1160 may also include a firmware (FW) updater 1166. Also, the kernel space 1154 may include a serial packet interface (SPI) driver 1168 and a Universal Synchronous/Asynchronous Receiver/Transmitter (USART) driver 1170.

In one embodiment, there is an interface mechanism between the user space 1152 and kernel space 1154 that has minimum latency. For example, in cases when there is an invalid configuration being input by an application, such as the content update agent 371, the error should be reported as quickly as possible to the application. The application processor 1150 may also include modules in the user space 1152 or in the kernel space 1154 since the application processor 1150 could be operating in a battery-backed operating state during power outages.

Figure 14:
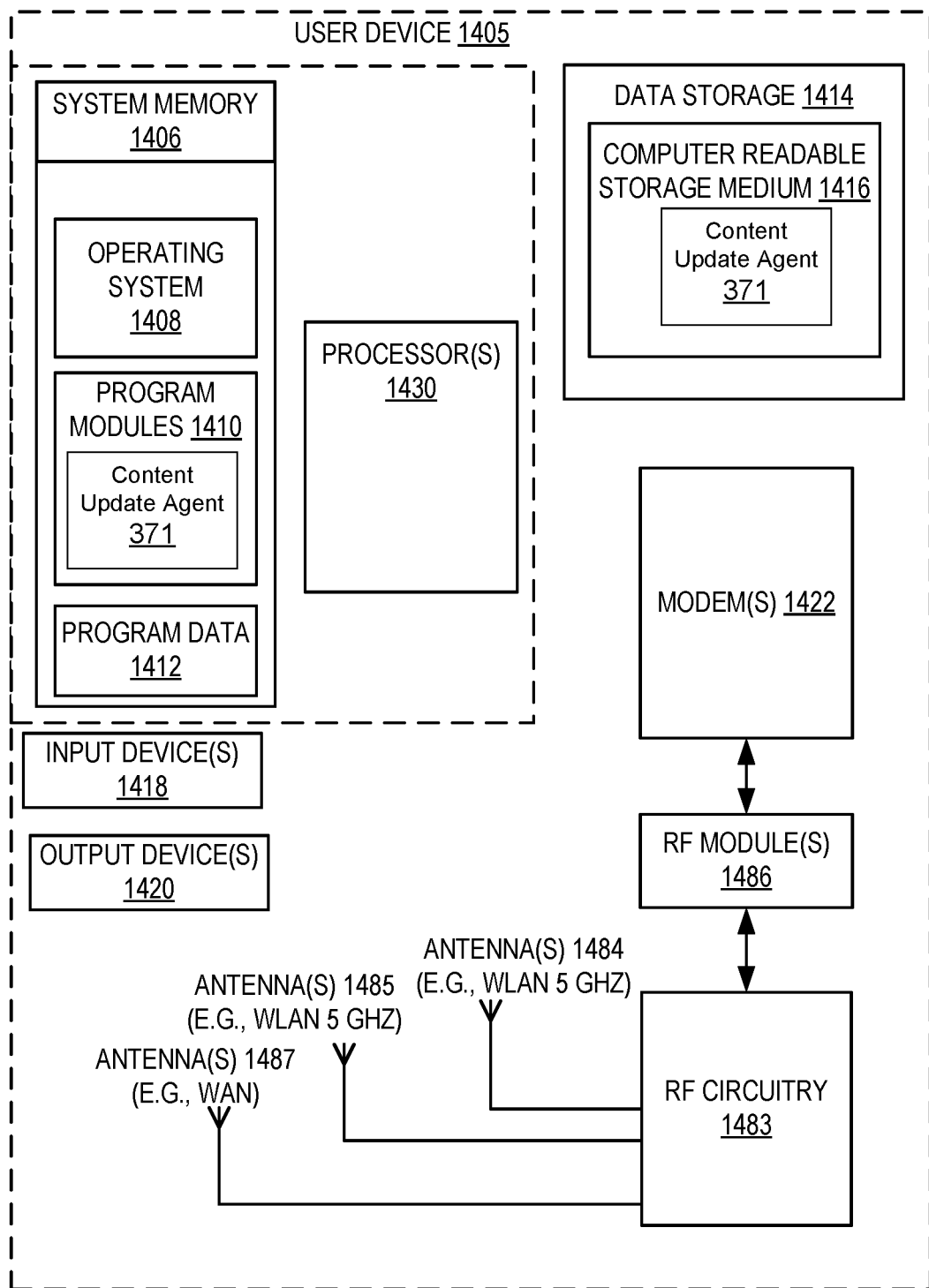
FIG. 14 is a block diagram of a network hardware device according to one embodiment.

FIG. 14 is a block diagram of a network hardware device 1400 with a content update agent 371 according to one embodiment. The network hardware device 1400 may correspond to the network hardware device 102-110 of FIG. 1. In another embodiment, the network hardware device 1400 may correspond to any of the wireless mesh point stations (MP STA) 210A-210Z, mesh access points (MAP) 220A-220K, and mesh portals (MPP) 230A-220M of FIG. 2. In another embodiment, the network hardware device 1400 may correspond to the mesh node 800 of FIG. 8. In another embodiment, the network hardware device 1400 may correspond to the mesh network device 1200 of FIG. 12. In another embodiment, the network hardware device 1400 may correspond to the application processor 1050 of FIG. 10. Alternatively, the network hardware device 1400 may be other electronic devices, as described herein.

The network hardware device 1400 includes one or more processor(s) 1430, such as one or more CPUs, microcontrollers, field programmable gate arrays, or other types of processors. The network hardware device 1400 also includes system memory 1406, which may correspond to any combination of volatile and/or non-volatile storage mechanisms. The system memory 1406 stores information that provides operating system component 1408, various program modules 1410, program data 1412, and/or other components. The program modules 1410 may include instructions of the content update agent 371. In one embodiment, the system memory 1406 stores instructions of methods to control operation of the network hardware device 1400. The network hardware device 1400 performs functions by using the processor(s) 1430 to execute instructions provided by the system memory 1406.

The network hardware device 1400 also includes a data storage device 1414 that may be composed of one or more types of removable storage and/or one or more types of non-removable storage. The data storage device 1414 includes a computer-readable storage medium 1416 on which is stored one or more sets of instructions embodying any of the methodologies or functions described herein. Instructions for the program modules 1410 may reside, completely or at least partially, within the computer-readable storage medium 1416, system memory 1406 and/or within the processor(s) 1430 during execution thereof by the network hardware device 1400, the system memory 1406 and the processor(s) 1430 also constituting computer-readable media. The network hardware device 1400 may also include one or more input devices 1418 (keyboard, mouse device, specialized selection keys, etc.) and one or more output devices 1420 (displays, printers, audio output mechanisms, etc.).

The network hardware device 1400 further includes a modem 1422 to allow the network hardware device 1400 to communicate via a wireless connections (e.g., such as provided by the wireless communication system) with other computing devices, such as remote computers, an item providing system, and so forth. The modem 1422 can be connected to one or more RF modules 1486. The RF modules 1486 may be a WLAN module, a WAN module, PAN module, GPS module, or the like. The antenna structures (antenna(s) 1484, 1485, and 1487) are coupled to the RF circuitry 1483, which is coupled to the modem 1422. The RF circuitry 1483 may include radio front-end circuitry, antenna switching circuitry, impedance matching circuitry, or the like. The antennas 1484 may be GPS antennas, NFC antennas, other WAN antennas, WLAN or PAN antennas, or the like. The modem 1422 allows the network hardware device 1400 to handle both voice and non-voice communications (such as communications for text messages, multimedia messages, media downloads, web browsing, etc.) with a wireless communication system. The modem 1422 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1422 may generate signals and send these signals to antenna(s) 1484 of a first type (e.g., WLAN 5 GHz), antenna(s) 1485 of a second type (e.g., WLAN 2.4 GHz), and/or antenna(s) 1487 of a third type (e.g., WAN), via RF circuitry 1483, and RF module(s) 1486 as descried herein. Antennas 1484, 1485, and 1487 may be configured to transmit in different frequency bands and/or using different wireless communication protocols. The antennas 1484, 1485, and 1487 may be directional, omnidirectional, or non-directional antennas. In addition to sending data, antennas 1484, 1485, and 1487 may also receive data, which is sent to appropriate RF modules connected to the antennas. One of the antennas 1484, 1485, 1487 may be any combination of the antenna structures described herein.

In one embodiment, the network hardware device 1400 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the mesh network and the second wireless connection may be associated with serving a content file to a client consumption device, as described herein.

Though a modem 1422 is shown to control transmission and reception via antenna (1484, 1485, 1487), the network hardware device 1400 may alternatively include multiple modems, each of which is configured to transmit/receive data via a different antenna and/or wireless transmission protocol.

Figure 15:
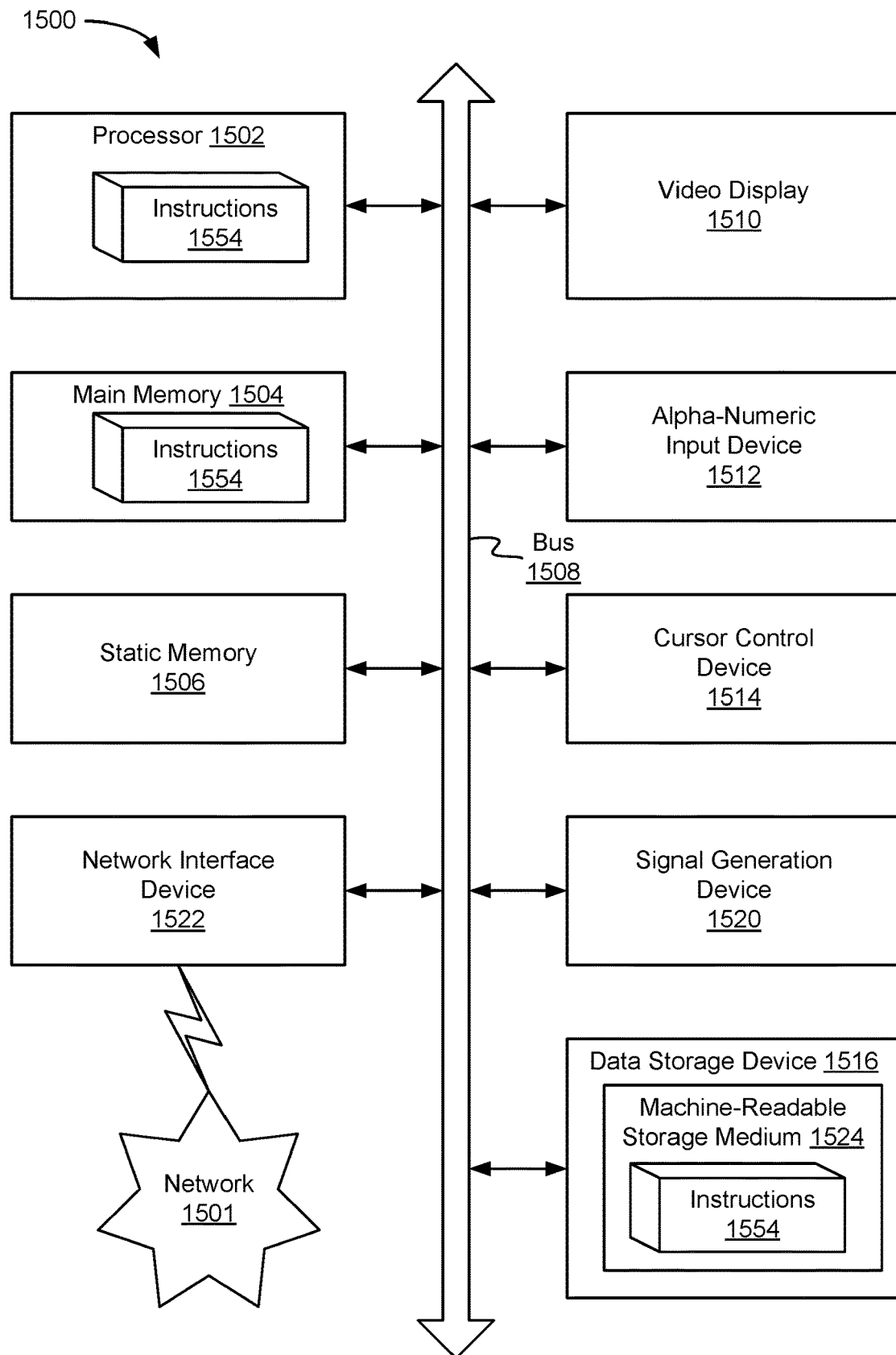
FIG. 15 illustrates a component diagram of a computer system which may implement one or more methods described herein.

FIG. 15 illustrates a component diagram of a computer system which may implement one or more methods of gateway selection as described herein. A set of instructions for causing the computer system 1500 to perform any one or more of the methods discussed herein may be executed by the computer system 1500. In one embodiment, the computer system 1500 may implement the functions of the content update agent 371 of FIG. 1. In other embodiments, the computer system 1500 may implement the functions of media provider service 130, content management service 140, content server 372, content daemon 373, distributed cache 374, and/or mesh communication component 375.

In one embodiment, the computer system 1500 may be connected to other computer systems by a network 1501 provided by a Local Area Network (LAN), an intranet, an extranet, the Internet or any combination thereof. The computer system may operate in a collection of one or more computers to implement a cloud computing system. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 1500 includes a processing device 1502, a main memory 1504 (e.g., read-only memory (ROM), flash memory, dynamic random access memory (DRAM) such as synchronous DRAM (SDRAM), etc.), a static memory 1506 (e.g., flash memory, static random access memory (SRAM), etc.) and a data storage device 1516, which communicate with each other via a bus 1508.

In one embodiment, the processing device 1502 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1502 may therefore include multiple processors. The processing device 1502 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 1502 may also be one or more special-purpose processing devices such as an application specific integrated circuit (ASIC), a field programmable gate array (FPGA), a digital signal processor (DSP), network processor or the like.

In one embodiment, the computer system 1500 may further include one or more network interface devices 1522. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse) and a signal generation device 1520 (e.g., a speaker).

In one embodiment, the data storage device 1518 may include a computer-readable storage medium 1524 on which is stored one or more sets of instructions 1554 embodying any one or more of the methods or functions described herein. The instructions 1554 may also reside, completely or at least partially, within the main memory 1504 and/or within the processing device 1502 during execution thereof by the computer system 1500; the main memory 1504 and the processing device 1502 also constituting machine-readable storage media.

While the computer-readable storage medium 1524 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by a cloud computing media provider service, an indication of a first plurality of video titles available from one or more video content providers and first video title metric data for the plurality of video titles reflecting viewing data for each of the first plurality of video titles;
   receiving, by the cloud computing media provider service, second video title metric data from one or more mesh nodes in a wireless mesh network, the second video title metric data reflecting viewing data for each of a second plurality of video titles;
   determining, by the cloud computing media provider service and using the first video title metric data and the second video title metric data, a probability value for each of the first plurality of video titles, the probability value indicating a likelihood that a corresponding video title will be requested for viewing;
   selecting, by the cloud computing media provider service, a subset of the first plurality of video titles available for distribution to the one or more mesh nodes in the wireless mesh network, wherein the probability value of each of the video titles in the subset is higher than a probability value for each of video titles not selected for the subset;
   retrieving, by a cloud computing content management service, a video content file corresponding to one of the subset of the first plurality of video titles from a cloud storage location identified by an origin uniform resource locator (URL) associated with the video content file;
   determining, by the cloud computing content management service, a plurality of byte offset ranges for the video content file, wherein a first byte offset range defines a location of a first data segment in the video content file and wherein a second byte offset range defines a second location of a second data segment in the video content file; and
   sending, by the cloud computing content management service, a content command to at a first mesh node in the wireless mesh network, the command comprising the origin URL and the first byte offset range, wherein the content command causes the first mesh node to fetch the first data segment of the video content file and store the first data segment in a distributed cache on the first mesh node.

2. The method of claim 1, further comprising:
   determining, by the cloud computing content management service, where to store each of the first data segment and the second data segment among the one or more mesh nodes in the wireless mesh network according to a distributed caching scheme, the distributed caching scheme comprising:
   storing, on each of the one or more mesh nodes in the wireless mesh network, a first temporal segment of the video content file, wherein the video content file is fully cached on at least one mesh node in the wireless mesh network; and
   distributing remaining segments of the video content file across the one or more mesh nodes in the wireless mesh network, without duplication.

3. A method comprising:
   determining, by a device, a first subset of a plurality of media titles available from one or more media content providers, each of the first subset having a higher relative popularity than media titles not included in the first subset;
   retrieving a first media content file corresponding to a first media title of the first subset from a storage location identified by an origin uniform resource locator (URL) associated with the first media content file;
   dividing the first media content file into a first data segment and a second data segment, wherein the first data segment and the second data segment comprise different data of the first media content file;

determining a first byte offset range defining a first location of the first data segment in the first media content file and a second byte offset range defining a second location of the second data segment;

sending a first command associated with the first data segment of the first media content file to a first mesh node of a plurality of mesh nodes in a wireless mesh network, the first command comprising the origin URL and the first byte offset range; and sending a second command associated with the second data segment of the first media content file to a second mesh node of the plurality of mesh nodes, the second command comprising the origin URL and the second byte offset range.

4. The method of claim 3, further comprising:

receiving media catalog data from the one or more media content providers, the media catalog data indicating the plurality of media titles available from the one or more media content providers; and receiving media title metric data from the one or more media content providers and from the one or more mesh nodes in the wireless mesh network, the media title metric data indicating a relative popularity of each of the plurality of media titles.

5. The method of claim 3, wherein the first data segment comprises a first temporal segment of the first media content file having a first data size, wherein the second data segment comprises a later temporal segment of the first media content file having a second data size, and wherein the first data size is smaller than the second data size.

6. The method of claim 3, further comprising:

receiving mesh network configuration data from the one or more mesh nodes in the wireless mesh network;

identifying a second subset of a plurality of media content files corresponding to the first media title, the second subset including media content files corresponding to attributes indicated in the mesh network configuration data;

generating a manifest file listing identifiers of the media content files in the second subset; and retrieving the media content files in the second subset; and distributing the media content files in the second subset to the one or more mesh nodes in the wireless mesh network.

7. The method of claim 6, wherein the attributes indicated in the mesh network configuration data indicate at least one of a streaming protocol, media content resolution, encoding scheme, bit-rate, audio format, or language supported by the one or more mesh nodes in the wireless mesh network.

8. The method of claim 6, wherein the second subset of the plurality of media content files excludes media content files of the plurality of media content files corresponding to attributes not supported by the one or more mesh nodes in the wireless mesh network.

9. The method of claim 3, further comprising:

determining, according to a distributed caching scheme, a storage location for each of the first data segment and the second data segment, wherein the storage location includes the one or more mesh nodes.

10. The method of claim 9, wherein the distributed caching scheme indicates at least one of:

storing a complete media content file for each of a fixed number of the first subset of the plurality of media titles on each of the one or more mesh nodes in the wireless mesh network;

storing, on each of the one or more mesh nodes in the wireless mesh network, a first segment of each media content file that is fully cached on at least one mesh node in the wireless mesh network;

storing, on each of the one or more mesh nodes in the wireless mesh network, a first segment of a media content file for each of the plurality of media titles available from the one or more video content providers; or storing, on the one or more mesh nodes in the wireless mesh network and according to a hash function, segments of media content files that are fully cached on at least one mesh node in the wireless mesh network.

11. A cloud computing system comprising:

one or more computing devices, the one or more computing devices running:

a media provider service, wherein the media provider service determines a first subset of a plurality of media titles available from one or more media content providers, each of the first subset having a higher relative popularity than media titles not included in the first subset; and a content management service, wherein the content management service:

retrieves a first media content file corresponding to a first media title of the first subset from a storage location identified by an origin uniform resource locator (URL) associated with the first media content file;

divides the first media content file into a first data segment and a second data segment, wherein the first data segment and the second data segment comprise different data of the first media content file;

determines a first byte offset range defining a first location of the first data segment in the first media content file and a second byte offset range defining a second location of the second data segment;

sends a first command associated with the first data segment of the first media content file to a first mesh node of a plurality of mesh nodes in a wireless mesh network, the first command comprising the origin URL and the first byte offset range; and sends a second command associated with the second data segment of the first media content file to a second mesh node of the plurality of mesh nodes, the first command comprising the origin URL and the first byte offset range.

12. The cloud computing system of claim 11, wherein the media provider service further:

receives media catalog data from the one or more media content providers, the media catalog data indicating the plurality of media titles available from the one or more media content providers; and receives media title metric data from the one or more media content providers and from the one or more mesh nodes in the wireless mesh network, the media title metric data indicating a relative popularity of each of the plurality of media titles.

13. The cloud computing system of claim 11, wherein the first data segment comprises a first temporal segment of the first media content file having a first data size, wherein the second data segment comprises a later temporal segment of the first media content file having a second data size, and wherein the first data size is smaller than the second data size.

14. The cloud computing system of claim 11, wherein the media provider service further:

receives mesh network configuration data from the one or more mesh nodes in the wireless mesh network;

identifies a second subset of a plurality of media content files corresponding to the first media title, the second subset including media content files corresponding to attributes indicated in the mesh network configuration data;

generates a manifest file listing identifiers of the media content files in the second subset; and retrieve the media content files in the second subset; and distributes the media content files in the second subset to the one or more mesh nodes in the wireless mesh network.

15. The cloud computing system of claim 14, wherein the attributes indicated in the mesh network configuration data indicate at least one of a streaming protocol, media content resolution, encoding scheme, bit-rate, audio format, or language supported by the one or more mesh nodes in the wireless mesh network.

16. The cloud computing system of claim 14, wherein the second subset of the plurality of media content files excludes media content files of the plurality of media content files corresponding to attributes not supported by the one or more mesh nodes in the wireless mesh network.

17. The cloud computing system of claim 11, wherein the content management service further:

determines, according to a distributed caching scheme, a storage location for each of the first data segment and the second data segment, wherein the storage location includes the one or more mesh nodes.

18. The cloud computing system of claim 17, wherein the distributed caching scheme causes the content management service to at least one of:

store a complete media content file for each of a fixed number of the first subset of the plurality of media titles on each of the one or more mesh node in the wireless mesh network;

store, on each of the one or more mesh nodes in the wireless mesh network, a first segment of each media content file that is fully cached on at least one mesh node in the wireless mesh network;

store, on each of the one or more mesh nodes in the wireless mesh network, a first segment of a media content file for each of the plurality of media titles available from the one or more video content providers; or store, on the one or more mesh nodes in the wireless mesh network and according to a hash function, segments of media content files that are fully cached on at least one mesh node in the wireless mesh network.

* * * * *